United States Patent
Fukumori et al.

(10) Patent No.: US 10,125,846 B2
(45) Date of Patent: Nov. 13, 2018

(54) BICYCLE CHAIN

(71) Applicant: SHIMANO INC., Sakai (JP)

(72) Inventors: Tsuyoshi Fukumori, Sakai (JP); Toru Kubota, Sakai (JP)

(73) Assignee: SHIMANO INC., Sakai (JP)

( * ) Notice: Subject to any disclaimer, the term of this patent is extended or adjusted under 35 U.S.C. 154(b) by 218 days.

(21) Appl. No.: 15/140,432

(22) Filed: Apr. 27, 2016

(65) Prior Publication Data
US 2017/0067535 A1 Mar. 9, 2017

Related U.S. Application Data

(63) Continuation-in-part of application No. 14/846,974, filed on Sep. 7, 2015, now abandoned.

(51) Int. Cl.
*F16G 13/06* (2006.01)
(52) U.S. Cl.
CPC .................................. *F16G 13/06* (2013.01)
(58) Field of Classification Search
CPC combination set(s) only.
See application file for complete search history.

(56) References Cited

U.S. PATENT DOCUMENTS

| 1,094,200 | A | * | 4/1914 | Dodge | F16G 13/04 474/213 |
|---|---|---|---|---|---|
| 5,203,745 | A | | 4/1993 | Wang | |
| 5,322,482 | A | | 6/1994 | Wang | |
| 5,322,483 | A | | 6/1994 | Wang | |
| 2005/0202914 | A1 | * | 9/2005 | Reiter | F16G 13/06 474/206 |
| 2015/0094180 | A1 | * | 4/2015 | Fukumori | B62M 9/00 474/206 |
| 2015/0094181 | A1 | * | 4/2015 | Fukumori | B62M 9/00 474/206 |
| 2015/0094182 | A1 | * | 4/2015 | Fukumori | F16G 13/06 474/206 |

FOREIGN PATENT DOCUMENTS

JP 55-52115 Y2 12/1977

* cited by examiner

*Primary Examiner* — Henry Y Liu
*Assistant Examiner* — Robert T Reese
(74) *Attorney, Agent, or Firm* — Mori & Ward, LLP

(57) ABSTRACT

A bicycle chain comprises a first outer link plate, a second outer link plate, and an axial protuberance protruding. The first outer link plate comprises a first end portion, a second end portion, and a first intermediate portion. The second outer link plate comprises a third end portion, a fourth end portion, and a second intermediate portion. The axial protuberance protrudes from a first inner surface of the first intermediate portion in an axial direction. The second intermediate portion of the second outer link plate is free from an axial protuberance protruding from a second inner surface of the second intermediate portion in an axial direction.

30 Claims, 27 Drawing Sheets

BICYCLE CHAIN

CROSS-REFERENCE TO RELATED APPLICATIONS

The present application is a continuation-in-part application of the U.S. patent application Ser. No. 14/846,974 filed Sep. 7, 2015. The contents of this application are incorporated herein by reference in their entirety.

BACKGROUND OF THE INVENTION

Field of the Invention

The present invention relates to a bicycle chain.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a chain (see, e.g., Japanese Unexamined Patent Application Publication No. S55-052115).

SUMMARY OF THE INVENTION

In accordance with a first aspect of the present invention, a bicycle chain comprises a first outer link plate, a second outer link plate, and an axial protuberance protruding. The first outer link plate comprises a first end portion, a second end portion, and a first intermediate portion. The first end portion includes a first opening having a first center axis. The second end portion includes a second opening having a second center axis. The first intermediate portion interconnects the first end portion and the second end portion. The second outer link plate is spaced apart from the first outer link plate in an axial direction parallel to the first center axis and the second center axis in an assembled state where the bicycle chain is assembled. The second outer link plate comprises a third end portion, a fourth end portion, and a second intermediate portion. The third end portion includes a third opening having a third center axis. The fourth end portion includes a fourth opening having a fourth center axis. The second intermediate portion interconnects the third end portion and the fourth end portion. The first outer link plate includes a first outer surface and a first inner surface opposite to the first outer surface in the axial direction. The second outer link plate includes a second outer surface and a second inner surface opposite to the second outer surface in the axial direction. The first inner surface and the second inner surface are configured to face each other in the assembled state. The axial protuberance protrudes from the first inner surface of the first intermediate portion in the axial direction. The second intermediate portion of the second outer link plate is free from an axial protuberance protruding from the second inner surface of the second intermediate portion in the axial direction.

With the bicycle chain according to the first aspect, it is possible to improve the holding function of the bicycle chain with maintaining the shifting performance of the bicycle chain between a plurality of bicycle sprockets by a front derailleur and/or a rear derailleur.

In accordance with a second aspect of the present invention, the bicycle chain according to the first aspect is configured so that the axial protuberance is provided integrally with the first outer link plate as a single unitary member.

With the bicycle chain according to the second aspect, it is possible to improve the rigidity of the bicycle chain.

In accordance with a third aspect of the present invention, the bicycle chain according to the first aspect is configured so that the axial protuberance is a separate member from the first outer link plate.

With the bicycle chain according to the third aspect, it is possible to select the material of the axial protuberance regardless of the material of the first outer link plate.

In accordance with a fourth aspect of the present invention, the bicycle chain according to the third aspect is configured so that the axial protuberance includes a metallic material.

With the bicycle chain according to the fourth aspect, it is possible to improve the wear and abrasion resistance of the axial protuberance.

In accordance with a fifth aspect of the present invention, the bicycle chain according to the fourth aspect is configured so that the axial protuberance is attached to the first intermediate portion via one of adhesive, diffusion bonding, and caulking.

With the bicycle chain according to the fifth aspect, it is possible to effectively attach the axial protuberance including the metallic material to the first outer link plate in consideration of mass production.

In accordance with a sixth aspect of the present invention, the bicycle chain according to the third aspect is configured so that the axial protuberance includes a resin material.

With the bicycle chain according to the sixth aspect, the resin material can reduce unusual noises caused by interference between the axial protuberance and a sprocket tooth of a bicycle sprocket.

In accordance with a seventh aspect of the present invention, the bicycle chain according to the sixth aspect is configured so that the axial protuberance is attached to the first intermediate portion via one of adhesive and integral molding.

With the bicycle chain according to the seventh aspect, it is possible to effectively attach the axial protuberance including the metallic material to the first outer link plate in consideration of mass production. The production efficiency of the bicycle chain is particularly improved if the axial protuberance is attached to the first intermediate portion via integral molding.

In accordance with an eighth aspect of the present invention, the bicycle chain according to any one of the first to seventh aspects further comprises a first inner link plate and a second inner link plate. The first inner link plate comprises a fifth end portion, a sixth end portion, and a third intermediate portion. The fifth end portion includes a fifth opening having a fifth center axis. The fifth end portion is pivotally coupled to the second end portion of the first outer link plate. The sixth end portion includes a sixth opening having a sixth center axis. The third intermediate portion interconnects the fifth end portion and the sixth end portion. The second inner link plate is spaced apart from the first inner link plate in the axial direction in the assembled state. The second inner link plate comprises a seventh end portion, an eighth end portion, and a fourth intermediate portion. The seventh end portion includes a seventh opening having a seventh center axis. The seventh end portion is pivotally coupled to the fourth end portion of the second outer link plate. The eighth end portion includes an eighth opening having an eighth center axis. The fourth intermediate portion interconnects the seventh end portion and the eighth end portion. The first inner link plate includes a third outer surface and a third inner surface opposite to the third outer surface in the axial direction. The second inner link plate includes a fourth outer surface and a fourth inner surface opposite to the fourth outer surface in the axial direction. The third inner surface and the fourth inner surface are configured to face each other in the assembled state. The axial protuberance includes an axial end surface facing the second inner surface of the second outer link plate in the axial direction in the assembled state. The axial end surface of the axial protuberance is closest to the second intermediate portion of the second outer link plate in the axial direction in the axial protuberance. The axial end surface is provided at an axial position which is substantially equal to an axial position of the third inner surface of the first inner link plate in the axial direction.

With the bicycle chain according to the eighth aspect, since the axial end surface is provided at the axial position which is substantially equal to the axial position of the third inner surface of the first inner link plate in the axial direction, it is possible to effectively improve the holding function of the bicycle chain.

In accordance with a ninth aspect of the present invention, the bicycle chain according to any one of the first to eighth aspects is configured so that the first outer link plate is closer to a bicycle frame than the second outer link plate in the axial direction in an engagement state where the bicycle chain is engaged with a bicycle sprocket rotatable relative to the bicycle frame.

With the bicycle chain according to the ninth aspect, it is possible to effectively maintain the shifting performance of the bicycle chain between a plurality of bicycle front sprockets by a front derailleur.

In accordance with a tenth aspect of the present invention, the bicycle chain according to any one of the first to eighth aspects is configured so that the second outer link plate is closer to a bicycle frame than the first outer link plate in the axial direction in an engagement state where the bicycle chain is engaged with a bicycle sprocket rotatable relative to the bicycle frame.

With the bicycle chain according to the tenth aspect, it is possible to effectively maintain the shifting performance of the bicycle chain between a plurality of bicycle rear sprockets by a rear derailleur.

In accordance with an eleventh aspect of the present invention, the bicycle chain according to any one of the first to tenth aspects is configured so that the axial protuberance includes an axial end surface and an inclined surface. The axial end surface faces the second inner surface of the second outer link plate in the axial direction in the assembled state. The inclined surface is inclined relative to the axial end surface.

With the bicycle chain according to the eleventh aspect, the inclined surface can reduce interference between the axial protuberance and a sprocket tooth of a bicycle sprocket when the sprocket tooth is engaged with the bicycle chain.

In accordance with a twelfth aspect of the present invention, the bicycle chain according to the eleventh aspect is configured so that the axial protuberance includes an additional inclined surface. The additional inclined surface is inclined relative to the axial end surface. The axial end surface is provided between the inclined surface and the additional inclined surface.

With the bicycle chain according to the twelfth aspect, the additional inclined surface can reduce interference between the axial protuberance and the sprocket tooth of the bicycle sprocket when the sprocket tooth is engaged with the bicycle chain.

In accordance with a thirteenth aspect of the present invention, the bicycle chain according to the twelfth aspect is configured so that the inclined surface extends from the first intermediate portion to the axial end surface beyond the first inner surface of the first outer link plate. The additional inclined surface extends from the first intermediate portion to the axial end surface beyond the first inner surface of the first outer link plate.

With the bicycle chain according to the thirteenth aspect, it is possible to further reduce interference between the axial protuberance and the sprocket tooth of the bicycle sprocket when the sprocket tooth is engaged with the bicycle chain.

In accordance with a fourteenth aspect of the present invention, a bicycle chain comprises a first outer link plate, a second outer link plate, and at least one axial protuberance. The first outer link plate comprises a first end portion, a second end portion, and a first intermediate portion. The first end portion includes a first opening having a first center axis. The second end portion includes a second opening having a second center axis. The first intermediate portion interconnects the first end portion and the second end portion. The second outer link plate is spaced apart from the first outer link plate in an axial direction parallel to the first center axis and the second center axis in an assembled state where the bicycle chain is assembled. The second outer link plate comprises a third end portion, a fourth end portion, and a second intermediate portion. The third end portion includes a third opening having a third center axis. The fourth end portion includes a fourth opening having a fourth center axis. The second intermediate portion interconnects the third end portion and the fourth end portion. The first outer link plate includes a first outer surface and a first inner surface opposite to the first outer surface in the axial direction. The second outer link plate includes a second outer surface and a second inner surface opposite to the second outer surface in the axial direction. The first inner surface and the second inner surface are configured to face each other in the assembled state. The at least one axial protuberance protrudes from at least one of the first inner surface and the second inner surface in the axial direction. The at least one axial protuberance is a separate member from the first outer link plate and the second outer link plate and is attached to at least one of the first outer link plate and the second outer link plate.

With the bicycle chain according to the fourteenth aspect, it is possible to select the material of the at least one axial protuberance regardless of the material of the at least one of the first outer link plate and the second outer link plate.

In accordance with a fifteenth aspect of the present invention, the bicycle chain according to the fourteenth aspect is configured so that the at least one axial protuberance includes a metallic material.

With the bicycle chain according to the fifteenth aspect, it is possible to improve the wear and abrasion resistance of the at least one axial protuberance.

In accordance with a sixteenth aspect of the present invention, the bicycle chain according to the fifteenth aspect is configured so that the at least one axial protuberance is attached to at least one of the first intermediate portion and the second intermediate portion via one of adhesive, diffusion bonding, and caulking.

With the bicycle chain according to the sixteenth aspect, it is possible to effectively attach the axial protuberance including the metallic material to the first outer link plate in consideration of mass production.

In accordance with a seventeenth aspect of the present invention, the bicycle chain according to the fourteenth aspect is configured so that the at least one axial protuberance includes a resin material.

With the bicycle chain according to the seventeenth aspect, the resin material can reduce unusual noises caused by interference between the axial protuberance and a sprocket tooth of a bicycle sprocket.

In accordance with an eighteenth aspect of the present invention, the bicycle chain according to the seventeenth aspect is configured so that the at least one axial protuberance is attached to at least one of the first intermediate portion and the second intermediate portion via one of adhesive and integral molding.

With the bicycle chain according to the eighteenth aspect, it is possible to effectively attach the axial protuberance including the metallic material to the first outer link plate in consideration of mass production. The production efficiency of the bicycle chain is particularly improved if the axial protuberance is attached to the first intermediate portion via integral molding.

In accordance with a nineteenth aspect of the present invention, the bicycle chain according to any one of the fourteenth to eighteenth aspects is configured so that the at least one axial protuberance includes an axial protuberance protruding from the first inner surface in the axial direction. The second outer link plate is free from the at least one axial protuberance.

With the bicycle chain according to the nineteenth aspect, in addition to the advantage of the fourteenth aspect of the present invention, it is possible to maintain the shifting performance of the bicycle chain between a plurality of bicycle sprockets by a front derailleur and/or a rear derailleur.

In accordance with a twentieth aspect of the present invention, the bicycle chain according to any one of the fourteenth to nineteenth aspects is configured so that the axial protuberance includes an axial end surface and an inclined surface. The axial end surface faces the second inner surface of the second outer link plate in the axial direction in the assembled state. The inclined surface is inclined relative to the axial end surface.

With the bicycle chain according to the twentieth aspect, the inclined surface can reduce interference between the axial protuberance and a sprocket tooth of a bicycle sprocket when the sprocket tooth is engaged with the bicycle chain.

In accordance with a twenty-first aspect of the present invention, the bicycle chain according to the twentieth aspect is configured so that the axial protuberance includes an additional inclined surface. The additional inclined surface is inclined relative to the axial end surface. The axial end surface is provided between the inclined surface and the additional inclined surface.

With the bicycle chain according to the twenty-first aspect, the additional inclined surface can reduce interference between the axial protuberance and the sprocket tooth of the bicycle sprocket when the sprocket tooth is engaged with the bicycle chain.

In accordance with a twenty-second aspect of the present invention, the bicycle chain according to the twenty-first aspect is configured so that the inclined surface extends from the first intermediate portion to the axial end surface beyond the first inner surface of the first outer link plate. The additional inclined surface extends from the first intermediate portion to the axial end surface beyond the first inner surface of the first outer link plate.

With the bicycle chain according to the twenty-second aspect, it is possible to further reduce interference between the axial protuberance and the sprocket tooth of the bicycle sprocket when the sprocket tooth is engaged with the bicycle chain.

In accordance with a twenty-third aspect of the present invention, the bicycle chain according to any one of the first to twenty-second aspects is configured so that the second outer link plate includes at least one chamfer disposed on at least one of the second outer surface and the second inner surface.

With the bicycle chain according to the twenty-third aspect, the at least one chamfer facilitates a shifting operation of the bicycle chain and/or avoids excessive contact between the second outer link plate and a bicycle derailleur. Accordingly, it is possible to improve the holding performance of the bicycle chain by the axial protuberance whereas the at least one chamfer facilitates the shifting performance of the bicycle chain and/or avoids excessive contact between the second outer link plate and a bicycle derailleur.

In accordance with a twenty-fourth aspect of the present invention, the bicycle chain according to the twenty-third aspect is configured so that the at least one chamfer is disposed on the second inner surface to facilitate a shifting operation of the bicycle chain.

With the bicycle chain according to the twenty-fourth aspect, it is possible to improve the holding performance of the bicycle chain by the axial protuberance whereas the at least one chamber improves the shifting performance of the bicycle chain In accordance with a twenty-fifth aspect of the present invention, the bicycle chain according to the twenty-third or twenty-fourth aspect is configured so that the at least one chamfer is disposed on the second outer surface to avoid excessive contact between the second outer link plate and a bicycle derailleur.

With the bicycle chain according to the twenty-fifth aspect, it is possible to improve the holding performance of the bicycle chain by the axial protuberance whereas the at least one chamber avoids excessive contact between the second outer link plate and the bicycle derailleur.

In accordance with a twenty-sixth aspect of the present invention, the bicycle chain according to any one of the first to twenty-fifth aspects is configured so that the first outer link plate includes at least one chamfer disposed on the first outer surface to reduce noise resulting from contact between the first outer link plate and a sprocket tooth of a bicycle sprocket.

With the bicycle chain according to the twenty-sixth aspect, it is possible to improve the holding performance of the bicycle chain by the axial protuberance whereas the at least one chamfer reduces noise resulting from contact between the first outer link plate and the sprocket tooth of the bicycle sprocket.

In accordance with a twenty-seventh aspect of the present invention, a bicycle chain comprises a first outer link plate, a second outer link plate, and an axial protuberance. The first outer link plate comprises a first end portion, a second end portion, and a first intermediate portion. The first end portion includes a first opening having a first center axis. The second end portion includes a second opening having a second center axis. The first intermediate portion interconnects the first end portion and the second end portion. The second outer link plate is spaced apart from the first outer link plate in an axial direction parallel to the first center axis and the second center axis in an assembled state where the bicycle chain is assembled. The second outer link plate comprises a third end portion, a fourth end portion, and a second intermediate portion. The third end portion includes a third opening having a third center axis. The fourth end portion includes a fourth opening having a fourth center axis. The second intermediate portion interconnects the third end portion and the fourth end portion. The first outer link plate includes a first outer surface and a first inner surface opposite to the first outer surface in the axial direction. The second outer link plate includes a second outer surface and a second inner surface opposite to the second outer surface in the axial direction. The first inner surface and the second inner surface are configured to face each other in the assembled state. The axial protuberance protrudes from the first inner surface of the first intermediate portion in the axial direction. The second outer link plate includes at least one chamfer disposed on at least one of the second outer surface and the second inner surface.

With the bicycle chain according to the twenty-seventh aspect, the axial protuberance improves the holding function of the bicycle chain. Furthermore, the at least one chamfer facilitates a shifting operation of the bicycle chain and/or avoids excessive contact between the second outer link plate and a bicycle derailleur. Accordingly, it is possible to improve the holding performance of the bicycle chain by the axial protuberance whereas the at least one chamfer facilitates the shifting performance of the bicycle chain and/or avoids excessive contact between the second outer link plate and the bicycle derailleur.

In accordance with a twenty-eighth aspect of the present invention, the bicycle chain according to the twenty-seventh aspect is configured so that the at least one chamfer is disposed on the second inner surface to facilitate a shifting operation of the bicycle chain.

With the bicycle chain according to the twenty-eighth aspect, it is possible to improve the holding performance of the bicycle chain by the axial protuberance whereas the at least one chamfer improves the shifting performance of the bicycle chain.

In accordance with a twenty-ninth aspect of the present invention, the bicycle chain according to the twenty-seventh or twenty-eighth aspect is configured so that the at least one chamfer is disposed on the second outer surface to avoid excessive contact between the second outer link plate and a bicycle derailleur.

With the bicycle chain according to the twenty-ninth aspect, it is possible to improve the holding performance of the bicycle chain by the axial protuberance whereas the at least one chamfer avoids excessive contact between the second outer link plate and the bicycle derailleur.

In accordance with a thirtieth aspect of the present invention, the bicycle chain according to any one of the twenty-seventh to twenty-ninth aspects is configured so that the first outer link plate includes at least one chamfer disposed on the first outer surface to reduce noise resulting from contact between the first outer link plate and a sprocket tooth of a bicycle sprocket.

With the bicycle chain according to the thirtieth aspect, it is possible to improve the holding performance of the bicycle chain by the axial protuberance whereas the at least one chamfer reduces noise resulting from contact between the first outer link plate and the sprocket tooth of the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
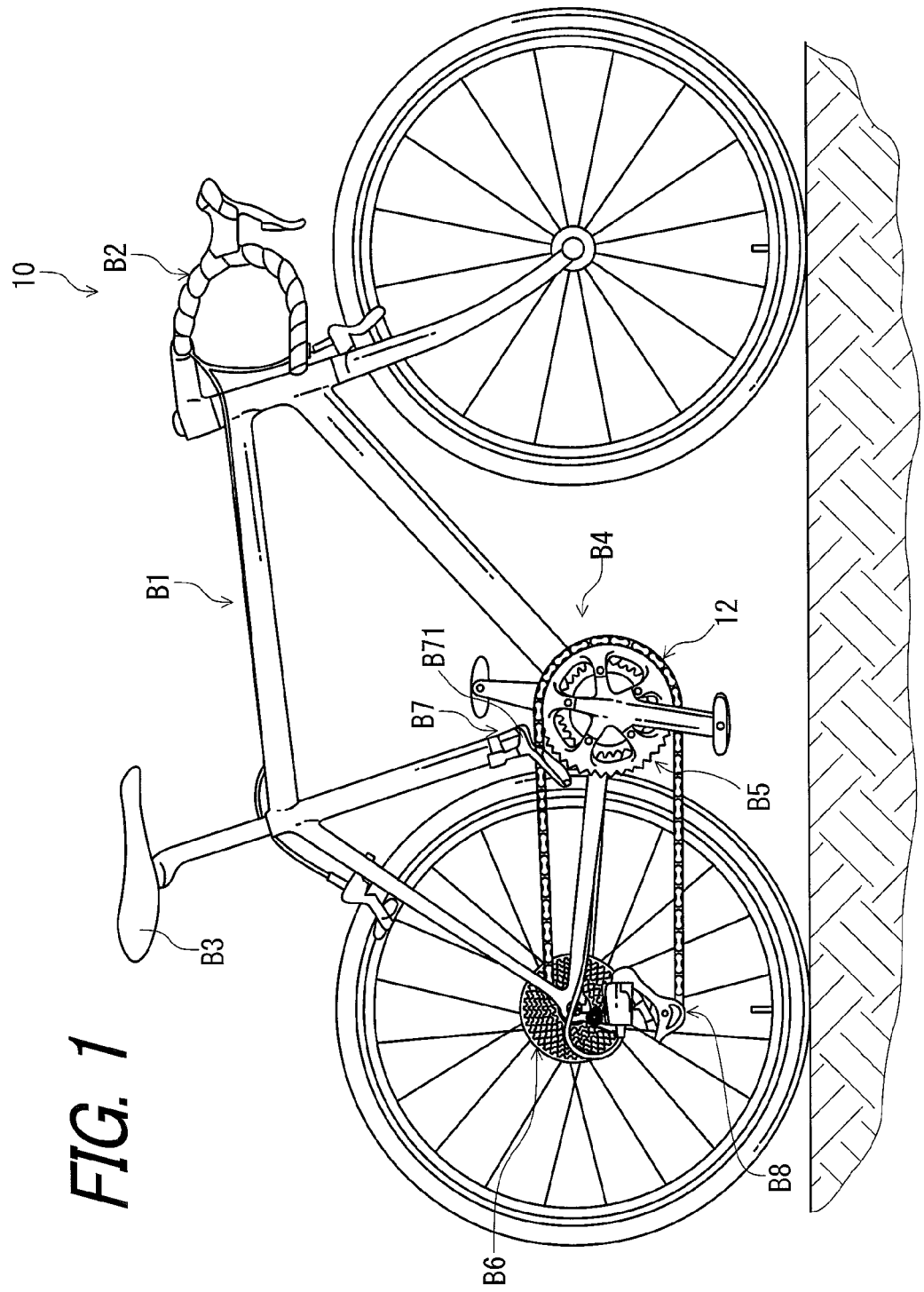
FIG. 1 is a side elevational view of a bicycle having a drive train that uses a bicycle chain in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated to be equipped with a bicycle chain 12 in accordance with a first embodiment. The bicycle 10 includes a bicycle frame B1, a handlebar B2, a saddle B3, and a drive train B4. The drive train B4 is configured to convert the rider's pedaling force into driving force. The bicycle chain 12 is a part of the drive train B4. The drive train B4 also includes a front sprocket B5, a rear sprocket B6, a front derailleur B7, and a rear derailleur B8. The front sprocket B5 can also be referred to as a bicycle sprocket B5. The rear sprocket B6 can also be referred to as a bicycle sprocket B6. The front crankset B5 is rotatably mounted on a bottom bracket of the bicycle frame B1. The bicycle chain 12 is arranged on the front crankset B5 and the rear sprocket B6 so as to extend therebetween. The front derailleur B7 and the rear derailleur B8 are configured and arranged to change gears by shifting the bicycle chain 12 in a transverse direction of the bicycle 10. The front derailleur B7 can also be referred to as a bicycle derailleur B7. The rear derailleur B8 can also be referred to as a bicycle derailleur B8.

In this embodiment, the following directional terms "front", "rear", "forward", "rearward", "left", "right", "transverse", "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12, should be interpreted relative to the bicycle chain 12 as mounted on the bicycle 10 used in an upright riding position on a horizontal surface as illustrated in FIG. 1.

Figure 2:
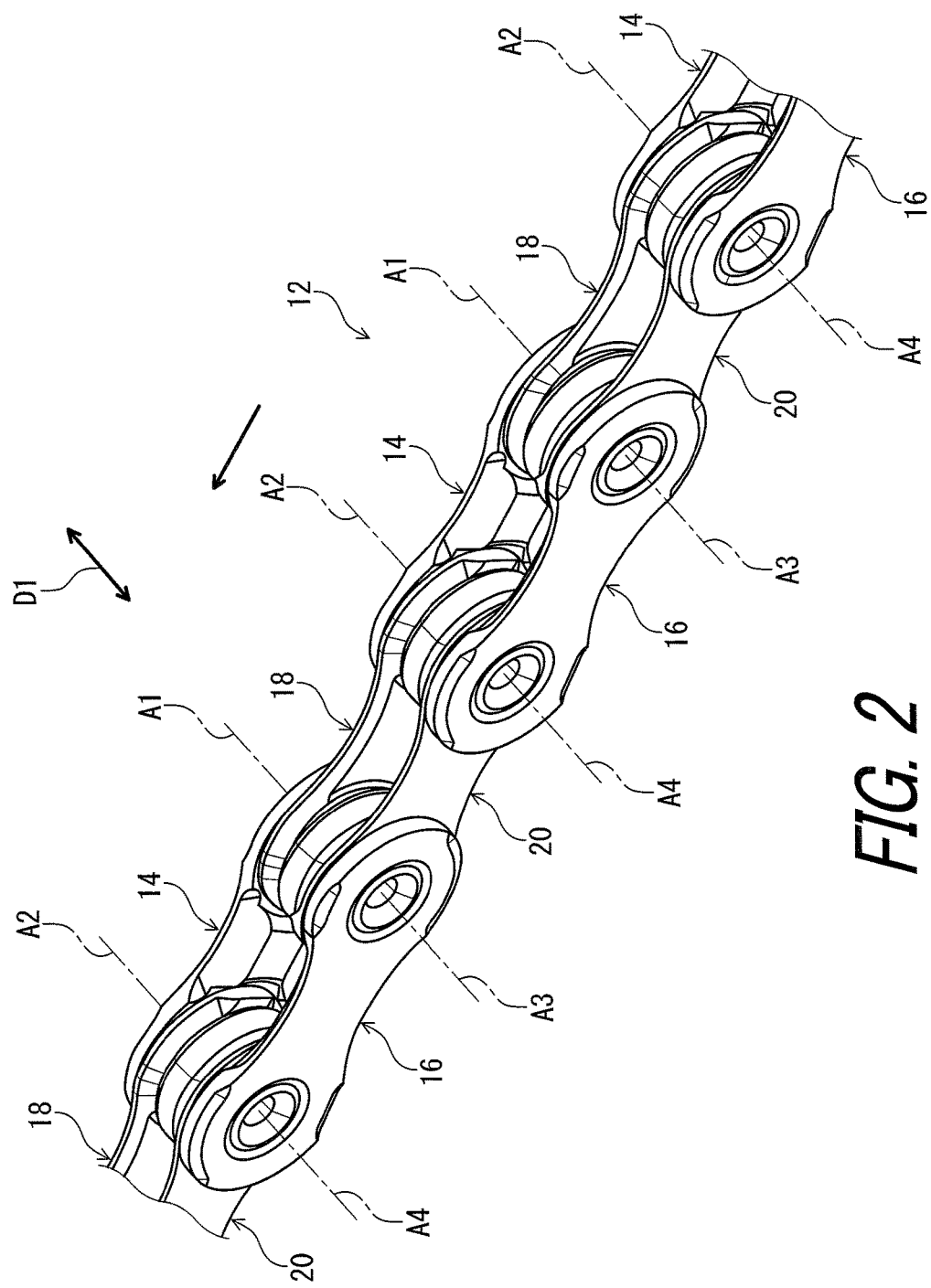
FIG. 2 is a partial perspective view of the bicycle chain.

Referring initially to FIG. 2, the bicycle chain 12 comprises a first outer link plate 14, a second outer link plate 16, a first inner link plate 18, and a second inner link plate 20. In this embodiment, the bicycle chain 12 comprises a plurality of first outer link plates 14, a plurality of second outer link plates 16, a plurality of first inner link plates 18, and a plurality of second inner link plates 20.

Figure 3:
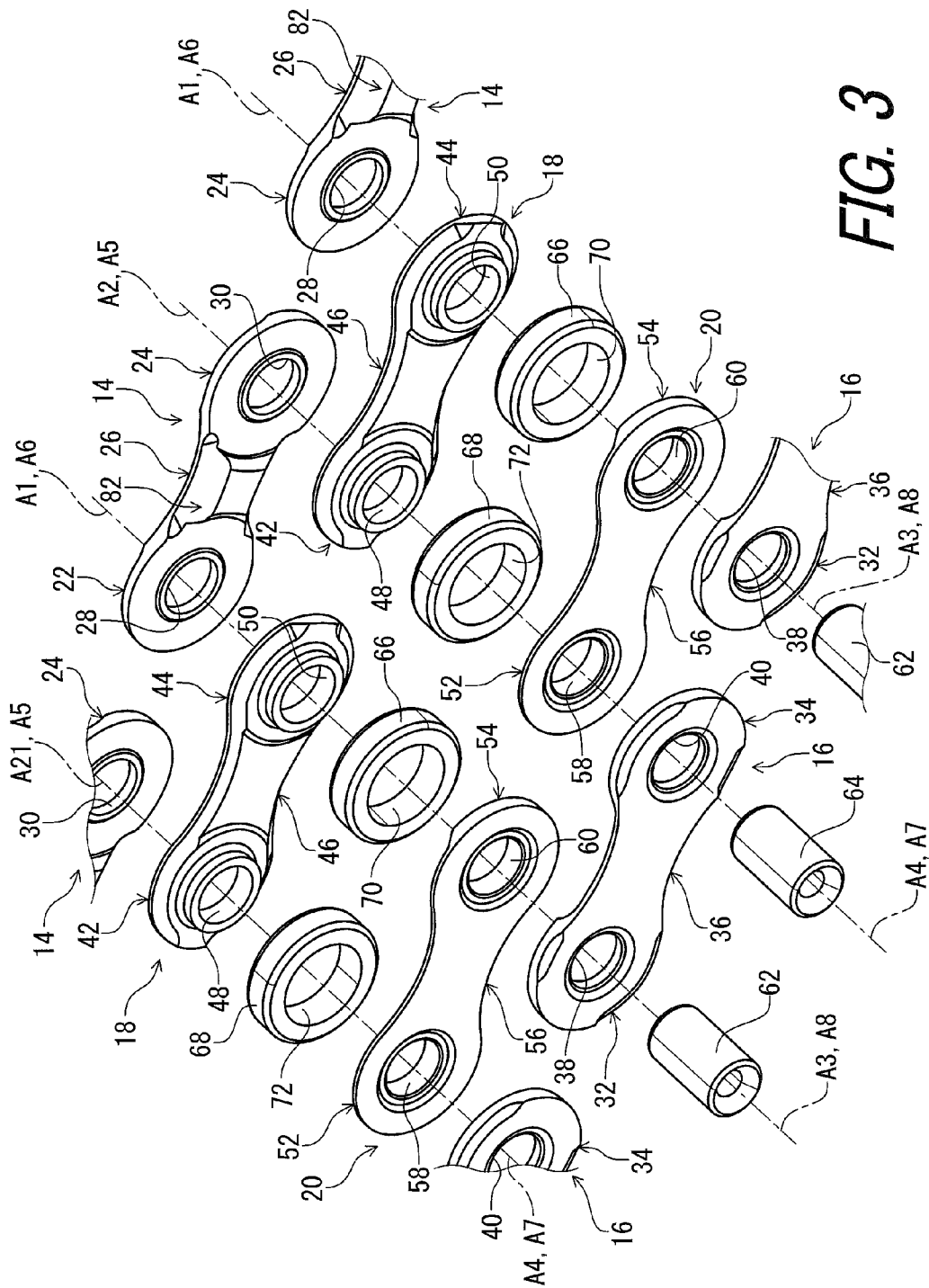
FIG. 3 is a partial exploded perspective view of the bicycle chain.

As seen in FIG. 3, the first outer link plate 14 comprises a first end portion 22, a second end portion 24, and a first intermediate portion 26. The first end portion 22 includes a first opening 28 having a first center axis A1. The second end portion 24 includes a second opening 30 having a second center axis A2. The first intermediate portion 26 interconnects the first end portion 22 and the second end portion 24. The second center axis A2 is parallel to the first center axis A1. The second center axis A2 can be substantially parallel to the first center axis A1.

The second outer link plate 16 comprises a third end portion 32, a fourth end portion 34, and a second intermediate portion 36. The third end portion 32 includes a third opening 38 having a third center axis A3. The fourth end portion 34 includes a fourth opening 40 having a fourth center axis A4. The second intermediate portion 36 interconnects the third end portion 32 and the fourth end portion 34. The fourth center axis A4 is parallel to the third center axis A3. The fourth center axis A4 can be substantially parallel to the third center axis A3. The third center axis A3 coincides with the first center axis A1. The third center axis A3 can substantially coincide with the first center axis A1. The fourth center axis A4 coincides with the second center axis A2. The fourth center axis A4 can substantially coincide with the second center axis A2.

The first inner link plate 18 comprises a fifth end portion 42, a sixth end portion 44, and a third intermediate portion 46. The fifth end portion 42 includes a fifth opening 48 having a fifth center axis A5. The sixth end portion 44 includes a sixth opening 50 having a sixth center axis A6. The third intermediate portion 46 interconnects the fifth end portion 42 and the sixth end portion 44.

The second inner link plate 20 comprises a seventh end portion 52, an eighth end portion 54, and a fourth intermediate portion 56. The seventh end portion 52 includes a seventh opening 58 having a seventh center axis A7. The eighth end portion 54 includes an eighth opening 60 having an eighth center axis A8. The fourth intermediate portion 56 interconnects the seventh end portion 52 and the eighth end portion 54.

The sixth end portion 44 is pivotally coupled to the first end portion 22 of the first outer link plate 14. The eighth end portion 54 is pivotally coupled to the third end portion 32 of the second outer link plate 16. The fifth end portion 42 is pivotally coupled to the second end portion 24 of the first outer link plate 14. The seventh end portion 52 is pivotally coupled to the fourth end portion 34 of the second outer link plate 16.

As seen in FIG. 3, the bicycle chain 12 further comprises a first link pin 62, a second link pin 64, a first roller 66, and a second roller 68. The first link pin 62 extends through the first opening 28, the third opening 38, the sixth opening 50, and the eighth opening 60. The sixth end portion 44 is pivotally coupled to the first end portion 22 of the first outer link plate 14 via the first link pin 62. The eighth end portion 54 is pivotally coupled to the third end portion 32 of the second outer link plate 16 via the first link pin 62.

The second link pin 64 extends through the second opening 30, the fourth opening 40, the fifth opening 48, and the seventh opening 58. The fifth end portion 42 is pivotally coupled to the second end portion 24 of the first outer link plate 14 via the second link pin 64. The seventh end portion 52 is pivotally coupled to the fourth end portion 34 of the second outer link plate 16 via the second link pin 64.

The first roller 66 has an annular shape and includes a first hole 70. The first link pin 62 extends through the first hole 70. The first roller 66 is rotatably mounted to the sixth end portion 44 of the first inner link plate 18 and the eighth end portion 54 of the second inner link plate 20.

The second roller 68 has an annular shape and includes a second hole 72. The second link pin 64 extends through the second hole 72. The second roller 68 is rotatably mounted to the fifth end portion 42 of the first inner link plate 18 and the seventh end portion 52 of the second inner link plate 20.

Figure 4:
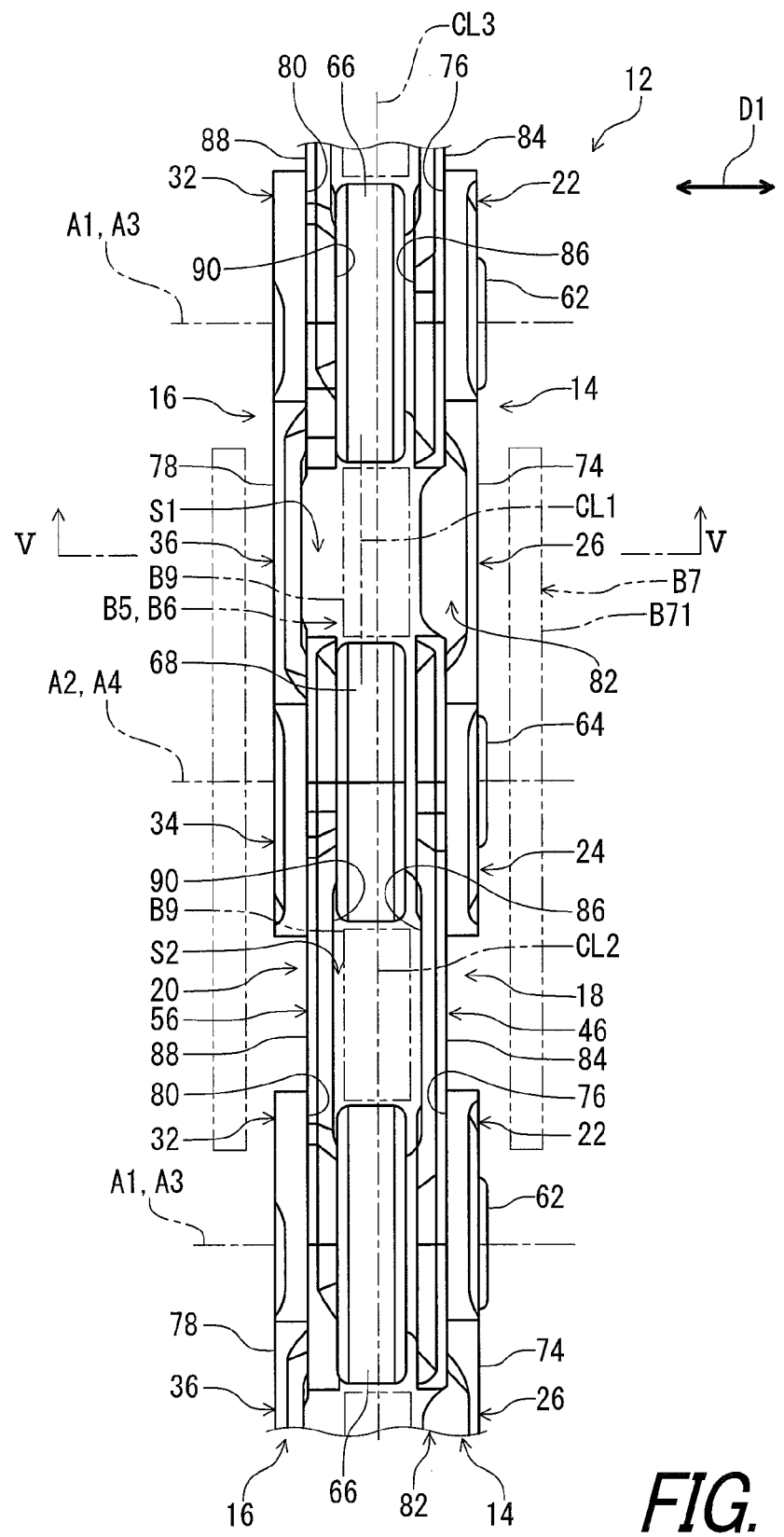
FIG. 4 is a partial plan view of the bicycle chain.

As seen in FIG. 4, the second outer link plate 16 is spaced apart from the first outer link plate 14 in an axial direction D1 parallel to the first center axis A1 and the second center axis A2 in an assembled state where the bicycle chain 12 is assembled. The second inner link plate 20 is spaced apart from the first inner link plate 18 in the axial direction D1 in the assembled state. The first inner link plate 18 and the second inner link plate 20 are partly provided between the first outer link plate 14 and the second outer link plate 16 in the axial direction D1.

The first outer link plate 14 includes a first outer surface 74 and a first inner surface 76 opposite to the first outer surface 74 in the axial direction D1. The second outer link plate 16 includes a second outer surface 78 and a second inner surface 80 opposite to the second outer surface 78 in the axial direction D1. The first inner surface 76 and the second inner surface 80 are configured to face each other in the assembled state.

The bicycle chain 12 comprises an axial protuberance 82. In this embodiment, the bicycle chain 12 comprises axial protuberances 82. However, the bicycle chain 12 can comprise at least one axial protuberance 82. The axial protuberance 82 protrudes from the first inner surface 76 of the first intermediate portion 26 in the axial direction D1. The axial protuberance 82 protrudes from the first inner surface 76 toward the second inner surface 80 in the axial direction D1.

Meanwhile, the second intermediate portion 36 of the second outer link plate 16 is free from an axial protuberance protruding from the second inner surface 80 of the second intermediate portion 36 in the axial direction D1. The axial protuberance 82 faces the second intermediate portion 36 of the second outer link plate 16 in the axial direction D1 without another axial protuberance 82 between the axial protuberance 82 and the second intermediate portion 36.

The axial protuberance 82 is selectively contactable with one of sprocket teeth B9 of the bicycle sprocket B5 and/or B6. The axial protuberance 82 and the second outer link plate 16 define a first tooth space S1 between the axial protuberance 82 and the second intermediate portion 36 of the second outer link plate 16 in the axial direction D1. One of the sprocket teeth B9 is provided in the first tooth space S1 in a state where the bicycle chain 12 is engaged with the bicycle sprocket B5 and/or B6.

The third intermediate portion 46 is selectively contactable with one of the sprocket teeth B9 of the bicycle sprocket B5 and/or B6. The fourth intermediate portion 56 is selectively contactable with one of the sprocket teeth B9 of the bicycle sprocket B5 and/or B6. The third intermediate portion 46 of the first inner link plate 18 and the fourth intermediate portion 56 of the second inner link plate 20 define a second tooth space S2 between the third intermediate portion 46 and the fourth intermediate portion 56 in the axial direction D1.

The first tooth space S1 is offset from the second tooth space S2 in the axial direction D2. Specifically, the first tooth space S1 includes a first axial center line CL1 defined at a center position of the first tooth space S1 in the axial direction D1. The second tooth space S2 includes a second axial center line CL2 defined at a center position of the second tooth space S2 in the axial direction D1. The first axial center line CL1 of the first tooth space S1 is offset from the second axial center line CL2 of the second tooth space S2 in the axial direction D2. The bicycle chain 12 includes a chain-center line CL3 defined at a center position of the first outer surface 74 and the second outer surface 78 in the axial direction D1. The first axial center line CL1 of the first tooth space S1 is offset from the chain-center line CL3 in the axial direction D1. The second axial center line CL2 of the second tooth space S2 coincides with the chain-center line CL3.

The first inner link plate 18 includes a third outer surface 84 and a third inner surface 86 opposite to the third outer surface 84 in the axial direction D1. The second inner link plate 20 includes a fourth outer surface 88 and a fourth inner surface 90 opposite to the fourth outer surface 88 in the axial direction D1. The third inner surface 86 and the fourth inner surface 90 are configured to face each other in the assembled state.

Figure 5:
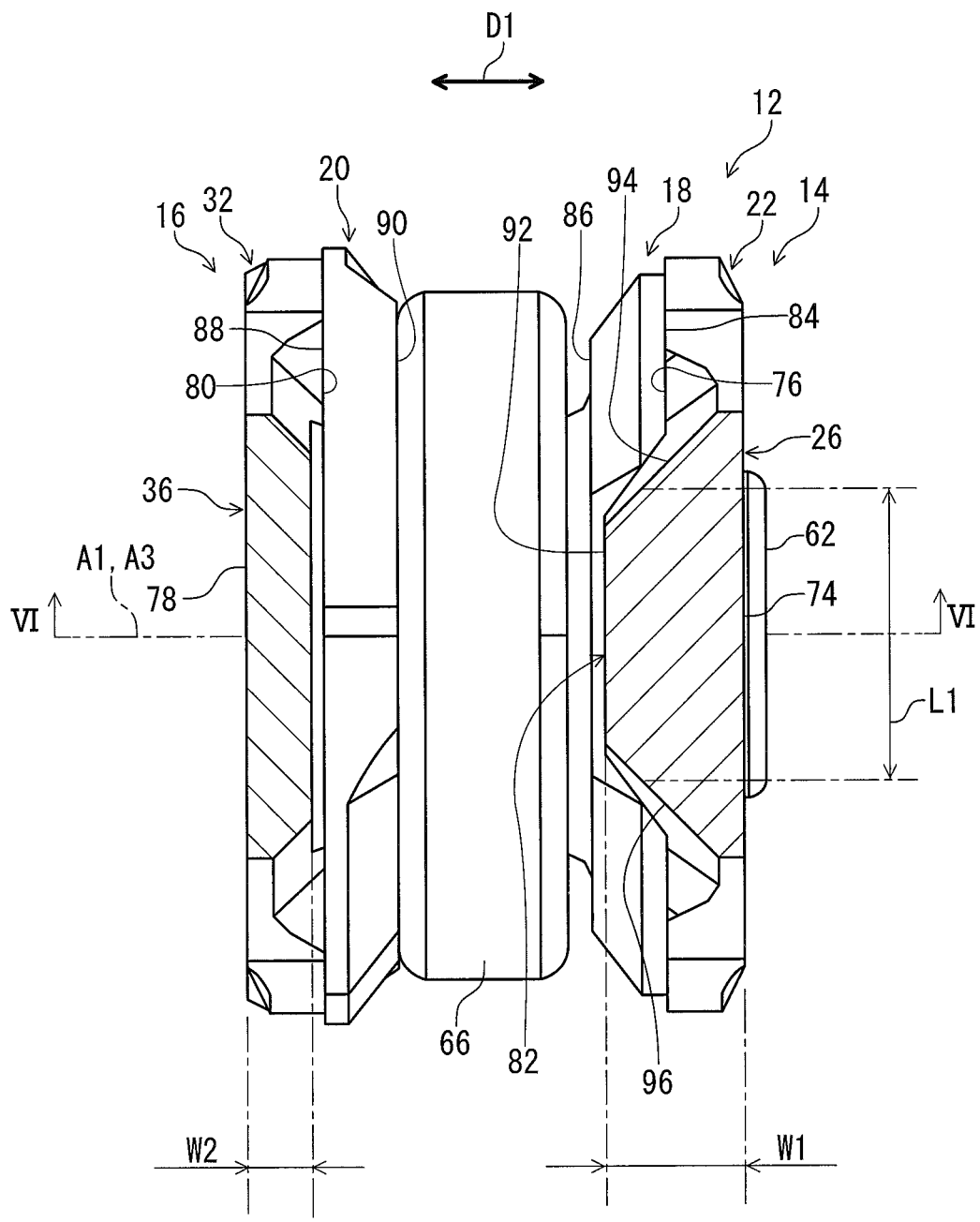
FIG. 5 is a cross-sectional view of the bicycle chain taken along with line V-V of FIG. 4.

As seen in FIG. 5, the axial protuberance 82 includes an axial end surface 92 facing the second inner surface 80 of the second outer link plate 16 in the axial direction D1 in the assembled state. The axial end surface 92 of the axial protuberance 82 is closest to the second intermediate portion 36 of the second outer link plate 16 in the axial direction D1 in the axial protuberance 82.

Figure 6:
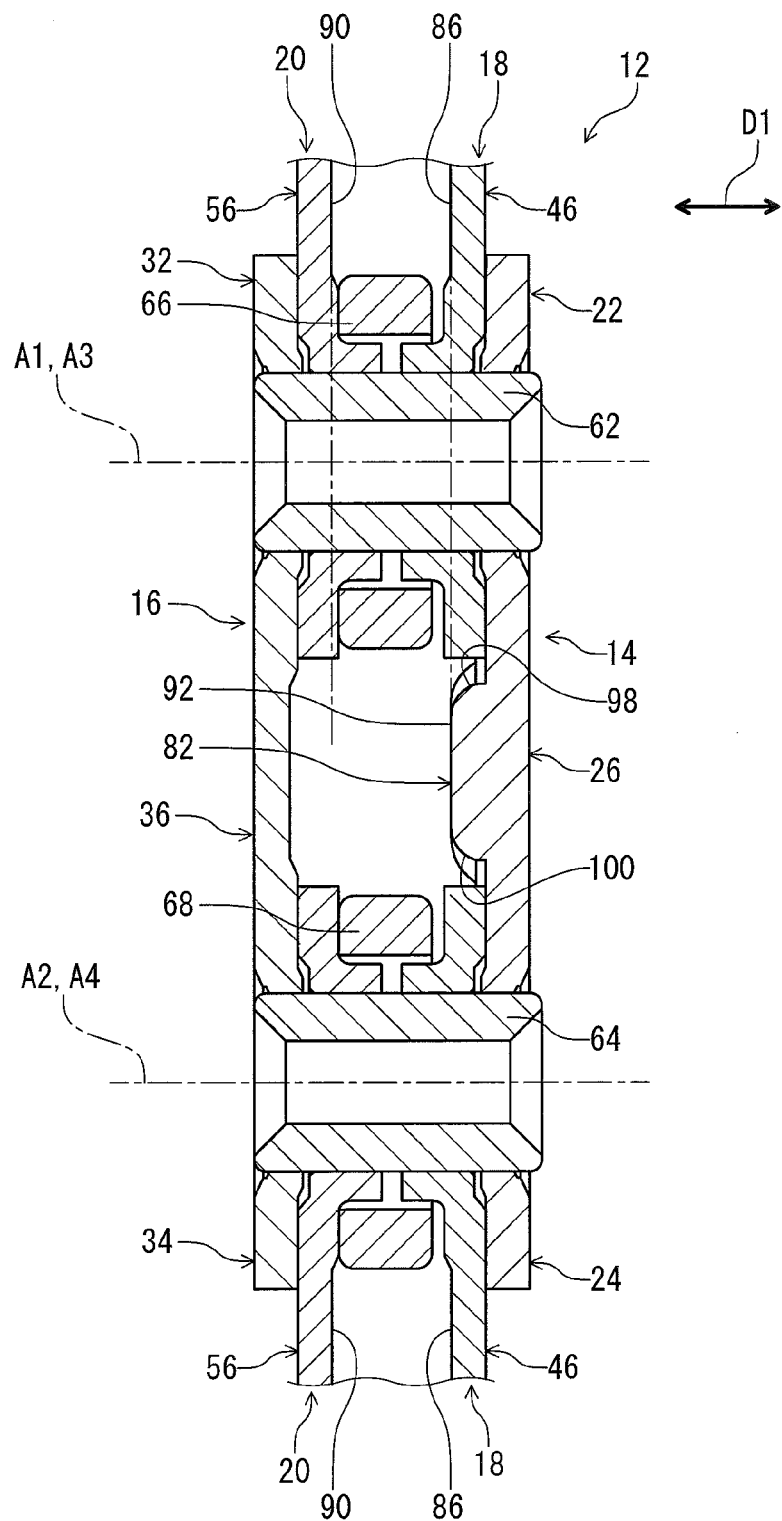
FIG. 6 is a cross-sectional view of the bicycle chain taken along with line VI-VI of FIG. 5.

As seen in FIG. 6, the axial end surface 92 is provided at an axial position which is substantially equal to an axial position of the third inner surface 86 of the first inner link plate 18 in the axial direction D1. In this embodiment, the axial end surface 92 is provided at the axial position which is equal to the axial position of the third inner surface 86 of the third intermediate portion 46 in the axial direction D1.

In this embodiment, the axial protuberance 82 is provided integrally with the first outer link plate 14 as a single unitary member. However, the axial protuberance 82 can be a separate member from the first outer link plate 14. The first outer link plate 14 and the axial protuberance 82 include a metallic material. Examples of the metallic material include iron, stainless steel, aluminum, and titanium. The first outer link plate 14 and the axial protuberance 82 can include a non-metallic material such as a resin material.

Figure 7:
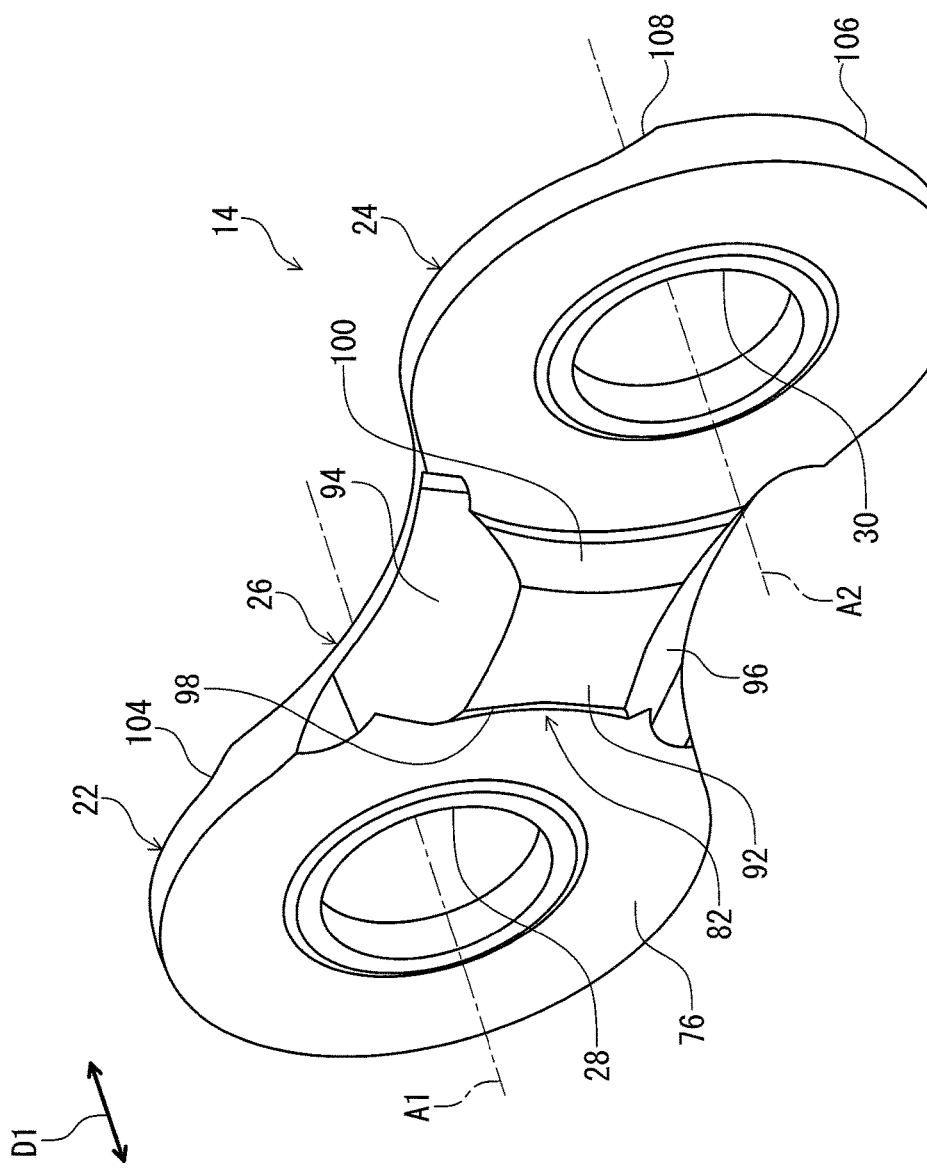
FIG. 7 is a perspective view of a first outer link plate of the bicycle chain.

As seen in FIG. 7, the axial protuberance 82 includes an inclined surface 94 and an additional inclined surface 96. The inclined surface 94 is inclined relative to the axial end surface 92. The additional inclined surface 96 is inclined relative to the axial end surface 92. The axial end surface 92 is provided between the inclined surface 94 and the additional inclined surface 96.

As seen in FIG. 5, the inclined surface 94 is inclined relative to the axial direction D1 and extends between the first end portion 22 and the second end portion 24. The additional inclined surface 96 is inclined relative to the axial direction D1 and extends between the first end portion 22 and the second end portion 24. A length L1 of the axial protuberance 82 gradually decreases from the first intermediate portion 26 to the axial end surface 92.

The inclined surface 94 extends from the first intermediate portion 26 to the axial end surface 92 beyond the first inner surface 76 of the first outer link plate 14. The additional inclined surface 96 extends from the first intermediate portion 26 to the axial end surface 92 beyond the first inner surface 76 of the first outer link plate 14.

An axial width W1 defined between the first outer surface 74 and the axial end surface 92 of the axial protuberance 82 in the axial direction D1 is larger than an axial width W2 of the second intermediate portion 36 defined in the axial direction D1.

Figure 8:
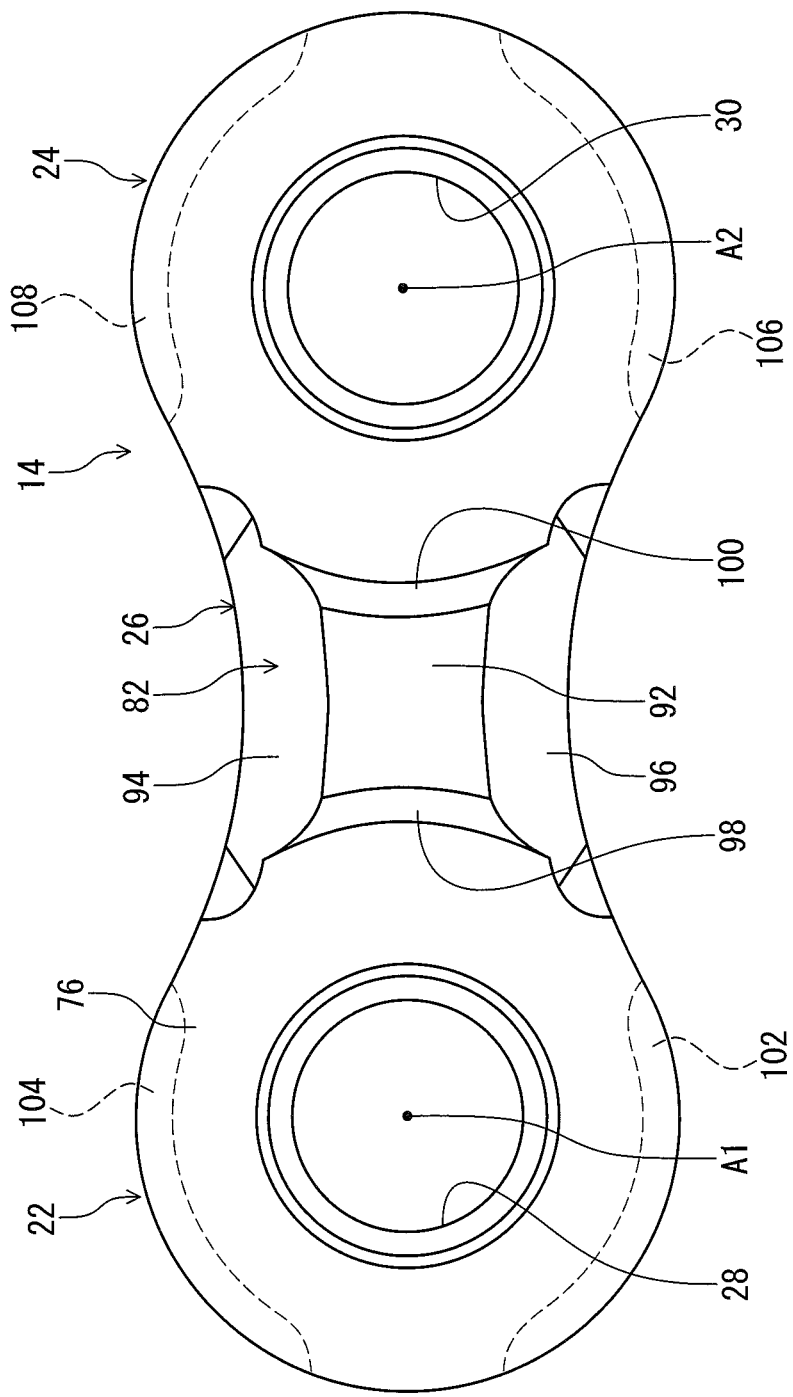
FIG. 8 is a side elevational view of the first outer link plate.

As seen in FIGS. 6 to 8, the axial protuberance 82 includes a first curved surface 98 and a second curved surface 100. The first curved surface 98 is provided between the axial end surface 92 and the first end portion 22. The second curved surface 100 is provided between the axial end surface 92 and the second end portion 24. As seen in FIG. 6, each of the first curved surface 98 and the second curved surface 100 has a convex shape. Each of the first curved surface 98 and the second curved surface 100 can also be a concave shape.

As seen in FIG. 8, the first curved surface 98 extends between the inclined surface 94 and the additional inclined surface 96. The second curved surface 100 extends between the inclined surface 94 and the additional inclined surface 96. The axial end surface 92 is provided between the first curved surface 98 and the second curved surface 100.

Figure 9:
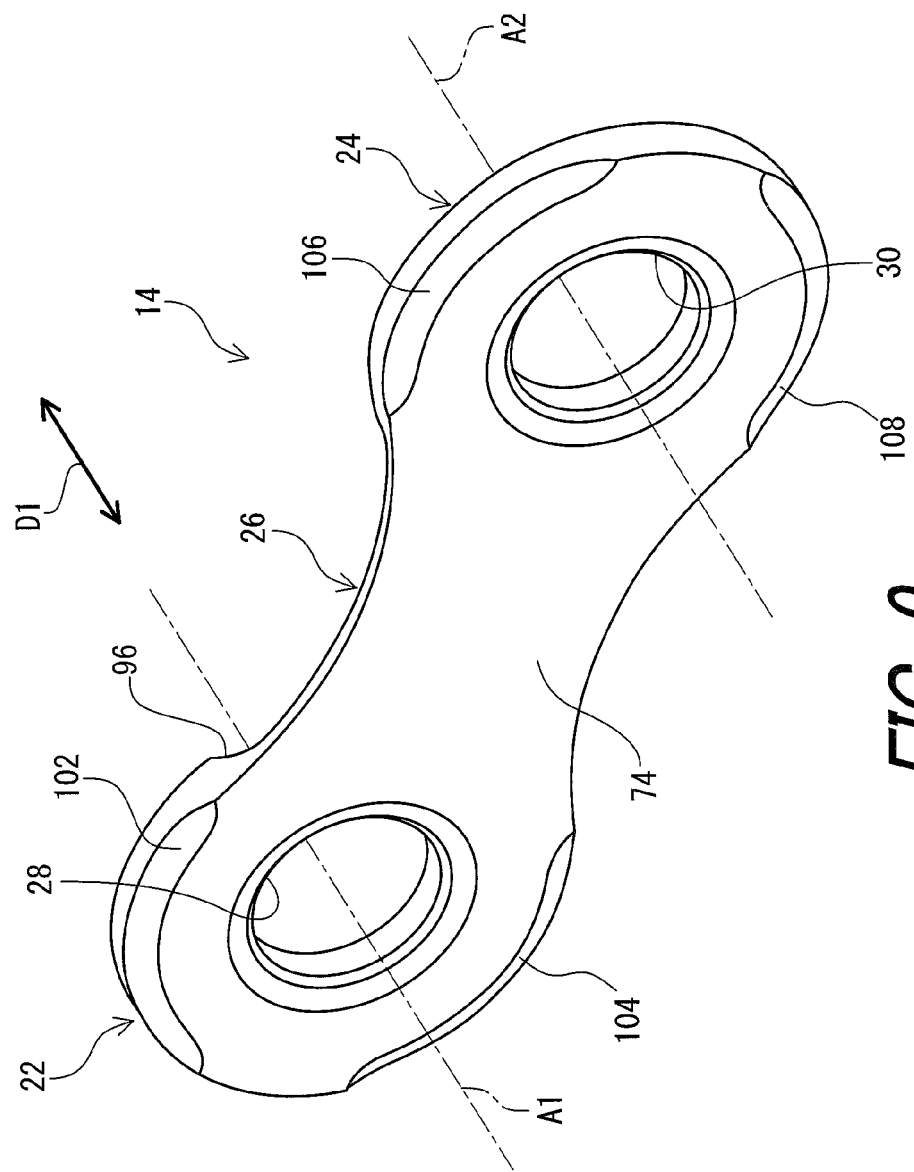
FIG. 9 is another perspective view of the first outer link plate.
Figure 10:
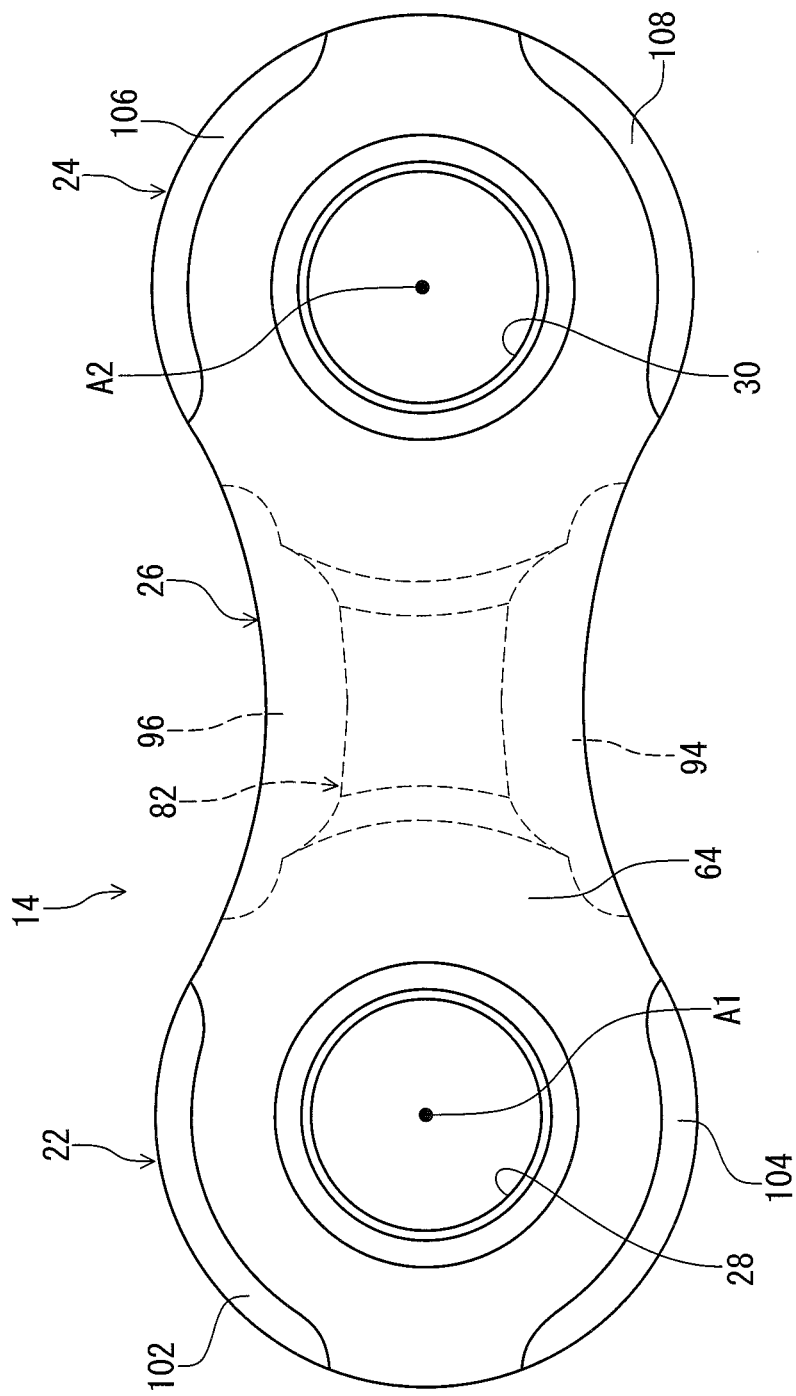
FIG. 10 is another side elevational view of the first outer link plate.

As seen in FIGS. 9 and 10, the first outer link plate 14 includes at least one chamfer 102, 104, 106, and/or 108 disposed on the first outer surface 74 to reduce noise resulting from contact between the first outer link plate 14 and the sprocket tooth B9 (FIG. 4) of the bicycle sprocket B5 or B6. In this embodiment, the first outer link plate 14 includes a plurality of chamfers 102, 104, 106, and 108. The plurality of chamfers 102, 104, 106, and 108 are disposed on the first outer surface 74 to reduce noise resulting from contact between the first outer link plate 14 and the sprocket tooth B9 (FIG. 4) of the bicycle sprocket B5 or B6. However, at least one of the chamfers 102, 104, 106, and 108 can be omitted from the first outer link plate 14 according to need. Furthermore, a total number of the chamfers 102, 104, 106, and 108 is not limited to this embodiment.

The chamfers 102 and 104 are disposed at the first end portion 22 on the first outer surface 74. The chamfers 106 and 108 are disposed at the second end portion 24 on the first outer surface 74. However, the arrangement of the chamfers 102, 104, 106, and 108 is not limited to this embodiment.

As seen in FIGS. 11 to 14, the second outer link plate 16 includes at least one chamfer 110, 112, 114, 116, 118, and/or 120 disposed on at least one of the second outer surface 78 and the second inner surface 80. In this embodiment, the second outer link plate 16 includes a plurality of chamfers 110, 112, 114, 116, 118, and 120 disposed on the second outer surface 78 and the second inner surface 80. However, at least one of the chamfers 110, 112, 114, 116, 118, and 120 can be omitted from the second outer link plate 16 according to need. Furthermore, a total number of the chamfers 110, 112, 114, 116, 118, and 120 is not limited to this embodiment.

Figure 11:
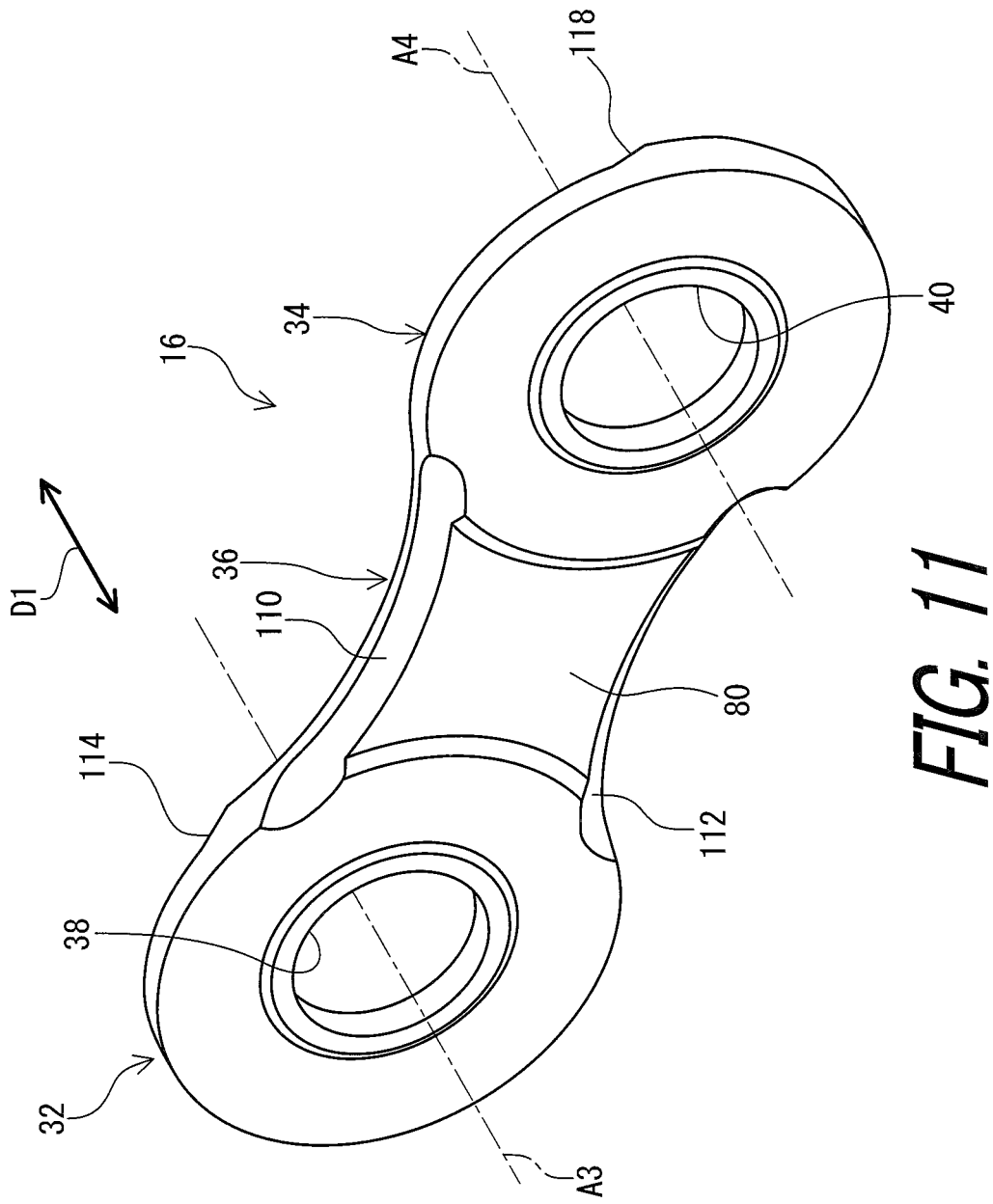
FIG. 11 is a perspective view of a second outer link plate of the bicycle chain.
Figure 12:
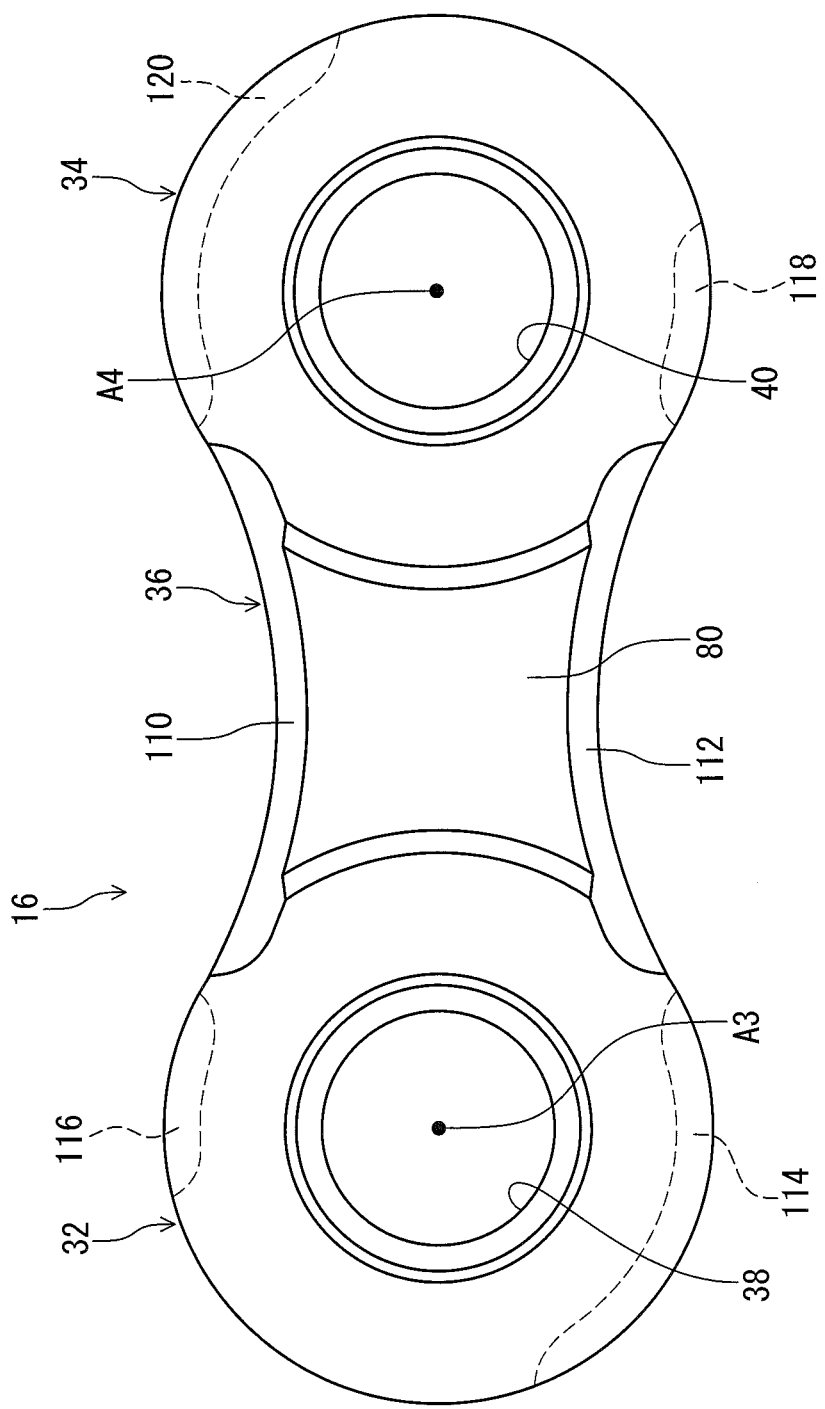
FIG. 12 is a side elevational view of the second outer link plate.

As seen in FIGS. 11 and 12, the at least one chamfer 110 and/or 112 is disposed on the second inner surface 80 to facilitate a shifting operation of the bicycle chain 12. In this embodiment, the plurality of chamfers 110 and 112 are disposed on the second inner surface 80 to facilitate the shifting operation of the bicycle chain 12. The chamfers 110 and 112 are disposed at the second intermediate portion 36 on the second inner surface 80. Furthermore, both ends of the chamfer 110 are respectively disposed at the third end portion 32 and the fourth end portion 34. Both ends of the chamfer 112 are respectively disposed at the third end portion 32 and the fourth end portion 34. The chamfers 110 and 112 extend between the third end portion 32 and the fourth end portion 34. However, the arrangement of the chamfers 110 and 112 is not limited to this embodiment. At least one of the chamfers 110 and 112 can be omitted from the second inner surface 80 of the second outer link plate 16 according to need. The chamfers 110 and 112 facilitate the sprocket tooth B9 (FIG. 4) to smoothly enter into the first tooth space S1 (FIG. 4).

Figure 13:
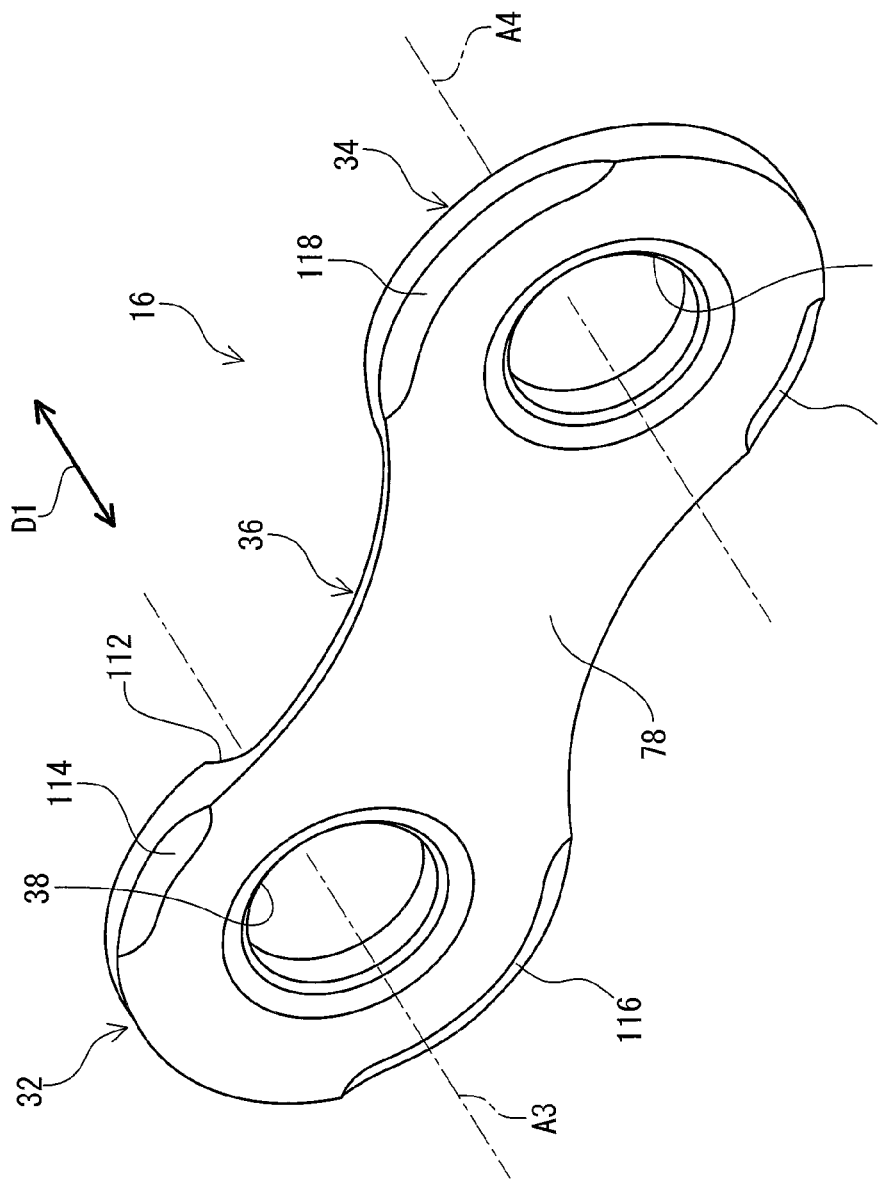
FIG. 13 is another perspective view of the second outer link plate.
Figure 14:
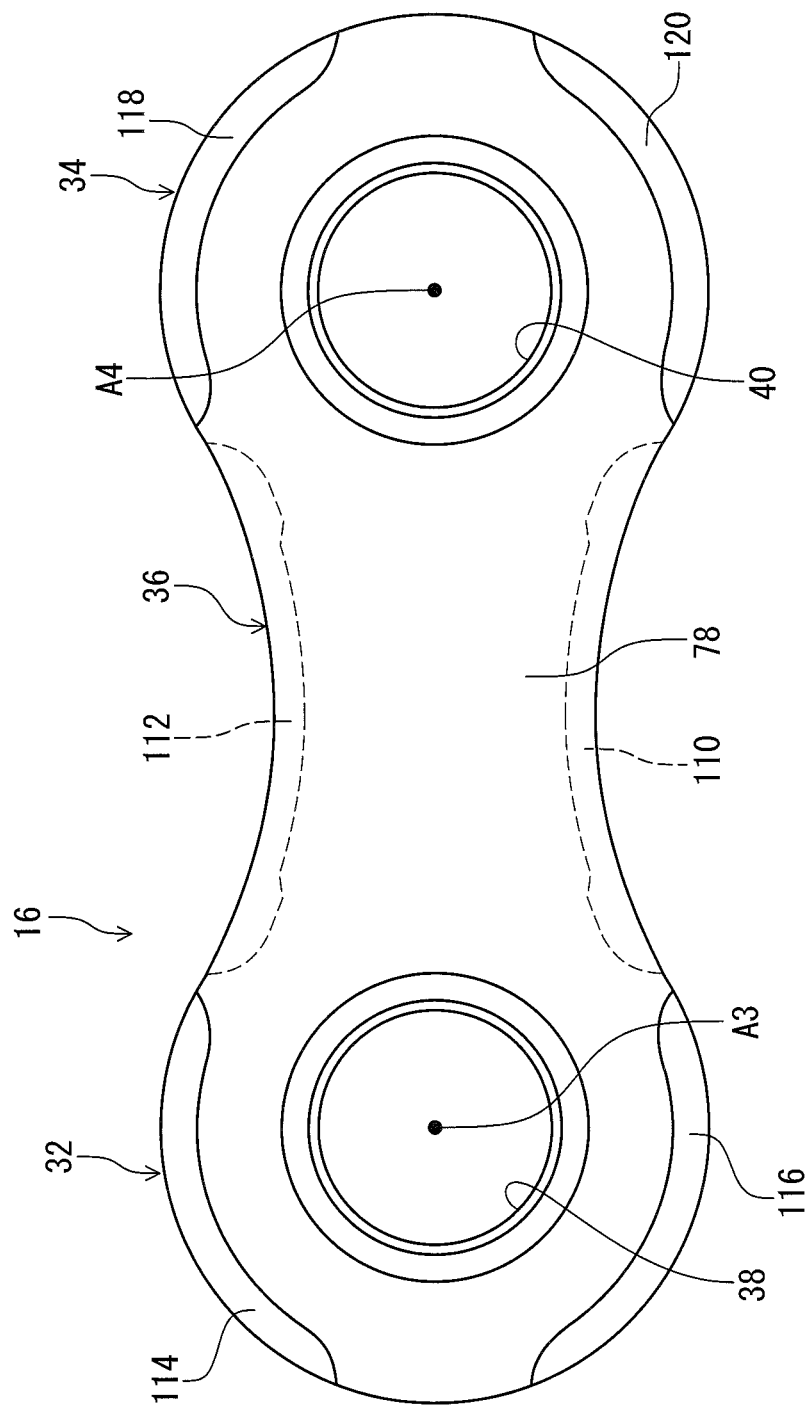
FIG. 14 is another side elevational view of the second outer link plate.

As seen in FIGS. 13 and 14, the at least one chamfer 114, 116, 118, and/or 120 is disposed on the second outer surface 78 to avoid excessive contact between the second outer link plate 16 and a bicycle derailleur B7 or B8 (FIG. 1). The plurality of chamfers 114, 116, 118, and 120 are disposed on the second outer surface 78 to avoid excessive contact between the second outer link plate 16 and the bicycle derailleur B7 or B8. For example, the plurality of chamfers 114, 116, 118, and 120 are disposed on the second outer surface 78 to avoid excessive contact between the second outer link plate 16 and a chain guide B71 (FIGS. 1 and 4) of the bicycle derailleur B7. The chamfers 114 and 116 are disposed at the third end portion 32 on the second outer surface 78. The chamfers 118 and 120 are disposed at the fourth end portion 34 on the second outer surface 78. However, the arrangement of the chamfers 114, 116, 118, and 120 is not limited to this embodiment. At least one of the chamfers 114, 116, 118, and 120 can be omitted from the second inner surface 80 of the second outer link plate 16 according to need.

Figure 15:
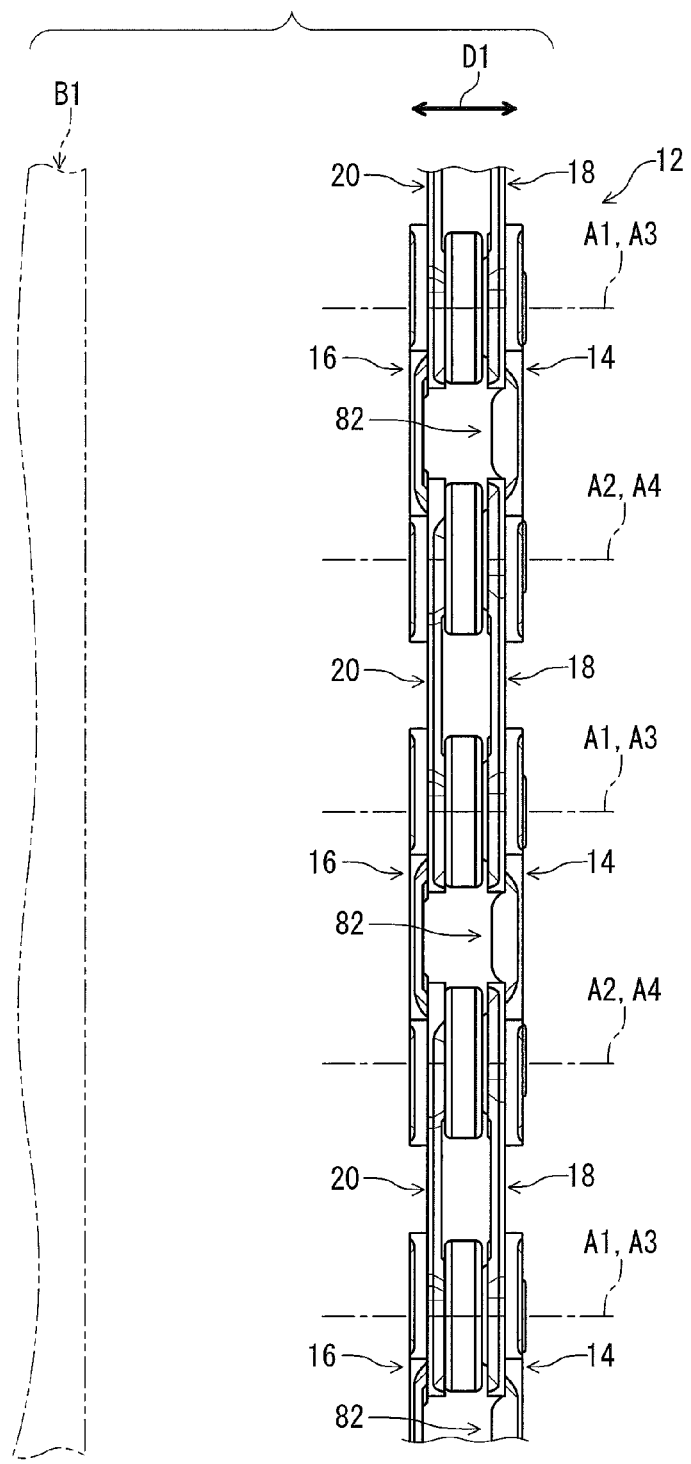
FIG. 15 is a plan view of the bicycle chain.
Figure 16:
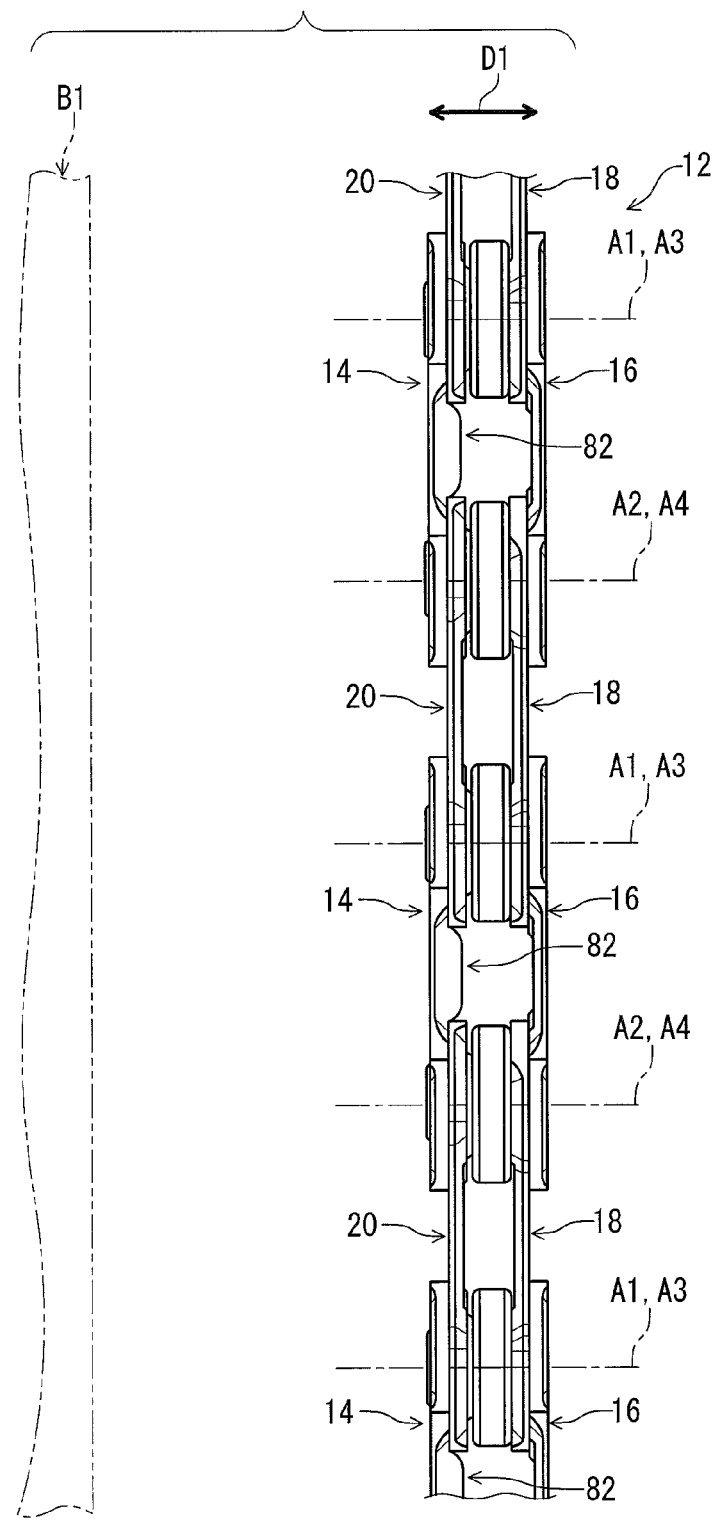
FIG. 16 is a plan view of a bicycle chain in accordance with a modification of the first embodiment.

As seen in FIG. 15, the second outer link plate 16 is closer to the bicycle frame B1 than the first outer link plate 14 in the axial direction D1 in an engagement state where the bicycle chain 12 is engaged with a bicycle sprocket rotatable relative to the bicycle frame B1. As seen in FIG. 16, however, the first outer link plate 14 can be closer to the bicycle frame B1 than the second outer link plate 16 in the axial direction D1 in the engagement state where the bicycle chain 12 is engaged with the bicycle sprocket B6 rotatable relative to the bicycle frame B1.

With the bicycle chain 12, it is possible to obtain the following effects.

(1) The axial protuberance 82 protrudes from the first inner surface 76 of the first intermediate portion 26 in the axial direction D1. The second intermediate portion 36 of the second outer link plate 16 is free from an axial protuberance protruding from the second inner surface 80 of the second intermediate portion 36 in the axial direction D1. Accordingly, it is possible to improve the holding function of the bicycle chain 12 with maintaining the shifting performance of the bicycle chain between the plurality of bicycle sprockets B5 and B6 by the front derailleur B7 and/or the rear derailleur B8.

(2) Since the axial protuberance 82 is provided integrally with the first outer link plate 14 as a single unitary member, it is possible to improve the rigidity of the bicycle chain 12.

(3) Since the axial protuberance 82 includes the metallic material, it is possible to improve the wear and abrasion resistance of the axial protuberance 82.

(4) Since the axial end surface 92 is provided at the axial position which is substantially equal to the axial position of the third inner surface 86 of the first inner link plate 18 in the axial direction D1, it is possible to effectively improve the holding function of the bicycle chain 12.

(5) The second outer link plate 16 is closer to the bicycle frame B1 than the first outer link plate 14 in the axial direction D1 in the engagement state where the bicycle chain 12 is engaged with the bicycle sprocket B6 rotatable relative to the bicycle frame B1. Accordingly, it is possible to effectively maintain the shifting performance of the bicycle chain 12 between a plurality of bicycle rear sprockets by the rear derailleur B8.

(6) The axial protuberance 82 includes the inclined surface 94 inclined relative to the axial end surface 92. Accordingly, the inclined surface 94 can reduce interference between the axial protuberance 82 and the sprocket tooth B9 of the bicycle sprocket B5 and/or B6 when the sprocket tooth B9 is engaged with the bicycle chain 12.

(7) The axial protuberance 82 includes the additional inclined surface 96 inclined relative to the axial end surface 92. Accordingly, the additional inclined surface 96 can reduce interference between the axial protuberance 82 and the sprocket tooth B9 of the bicycle sprocket B5 and/or B6 when the sprocket tooth B9 is engaged with the bicycle chain 12.

(8) The inclined surface 94 extends from the first intermediate portion 26 to the axial end surface 92 beyond the first inner surface 76 of the first outer link plate 14. The additional inclined surface 96 extends from the first intermediate portion 26 to the axial end surface 92 beyond the first inner surface 76 of the first outer link plate 14. Accordingly, it is possible to further reduce interference between the axial protuberance 82 and the sprocket tooth B9 of the bicycle sprocket B5 and/or B6 when the sprocket tooth B9 is engaged with the bicycle chain 12.

(9) The at least one chamfer 110, 112, 114, 116, 118, and/or 120 facilitates a shifting operation of the bicycle chain 12 and/or avoids excessive contact between the second outer link plate 16 and a bicycle derailleur. Accordingly, it is possible to improve the holding performance of the bicycle chain 12 by the axial protuberance 82 whereas the at least one chamfer 110, 112, 114, 116, 118 and/or 120 facilitates the shifting performance of the bicycle chain 12 and/or avoids excessive contact between the second outer link plate 16 and the bicycle derailleur B7 or B8.

(10) The at least one chamfer 110 and/or 112 is disposed on the second inner surface 80 to facilitate a shifting operation of the bicycle chain 12. Accordingly, it is possible to improve the holding performance of the bicycle chain 12 by the axial protuberance 82 whereas the at least one chamfer 110 and/or 112 improves the shifting performance of the bicycle chain 12.

(11) The at least one chamfer 114, 116, 118, and/or 120 is disposed on the second outer surface 78 to avoid excessive contact between the second outer link plate 16 and the bicycle derailleur B7 or B8. Accordingly, it is possible to improve the holding performance of the bicycle chain 12 by the axial protuberance 82 whereas the at least one chamfer 114, 116, 118, and/or 120 reduces noise resulting from contact between the second outer link plate 16 and the bicycle derailleur B7 or B8.

(12) The first outer link plate 14 includes at least one chamfer 102, 104, 106, and/or 108 disposed on the first outer surface 74 to reduce noise resulting from contact between the first outer link plate 14 and the sprocket tooth B9 of the bicycle sprocket B5 or B6. Accordingly, it is possible to improve the holding performance of the bicycle chain 12 by using the axial protuberance 82 whereas the at least one chamfer 102, 104, 106 and/or 108 reduces noise resulting from contact between the first outer link plate 14 and the sprocket tooth B9 of the bicycle sprocket B5 or B6.

Second Embodiment

A bicycle chain 212 in accordance with a second embodiment will be described below referring to FIGS. 17 to 19. The bicycle chain 212 has the same configuration as the bicycle chain 12 except for the axial protuberance. Thus, elements having substantially the same function as those in the first embodiment will be numbered the same here, and will not be described and/or illustrated again in detail here for the sake of brevity.

Figure 17:
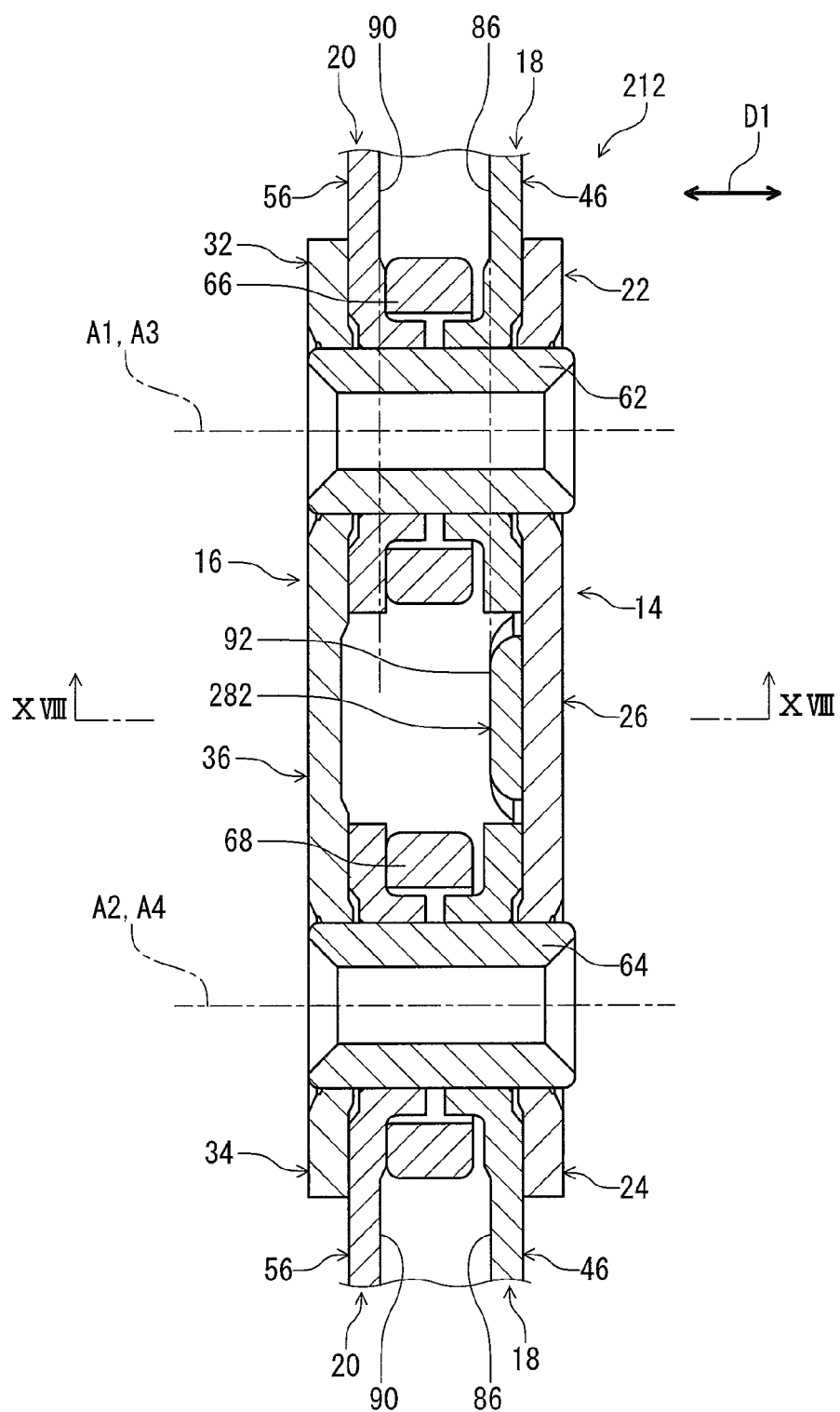
FIG. 17 is a cross-sectional view of a bicycle chain in accordance with a second embodiment.
Figure 18:
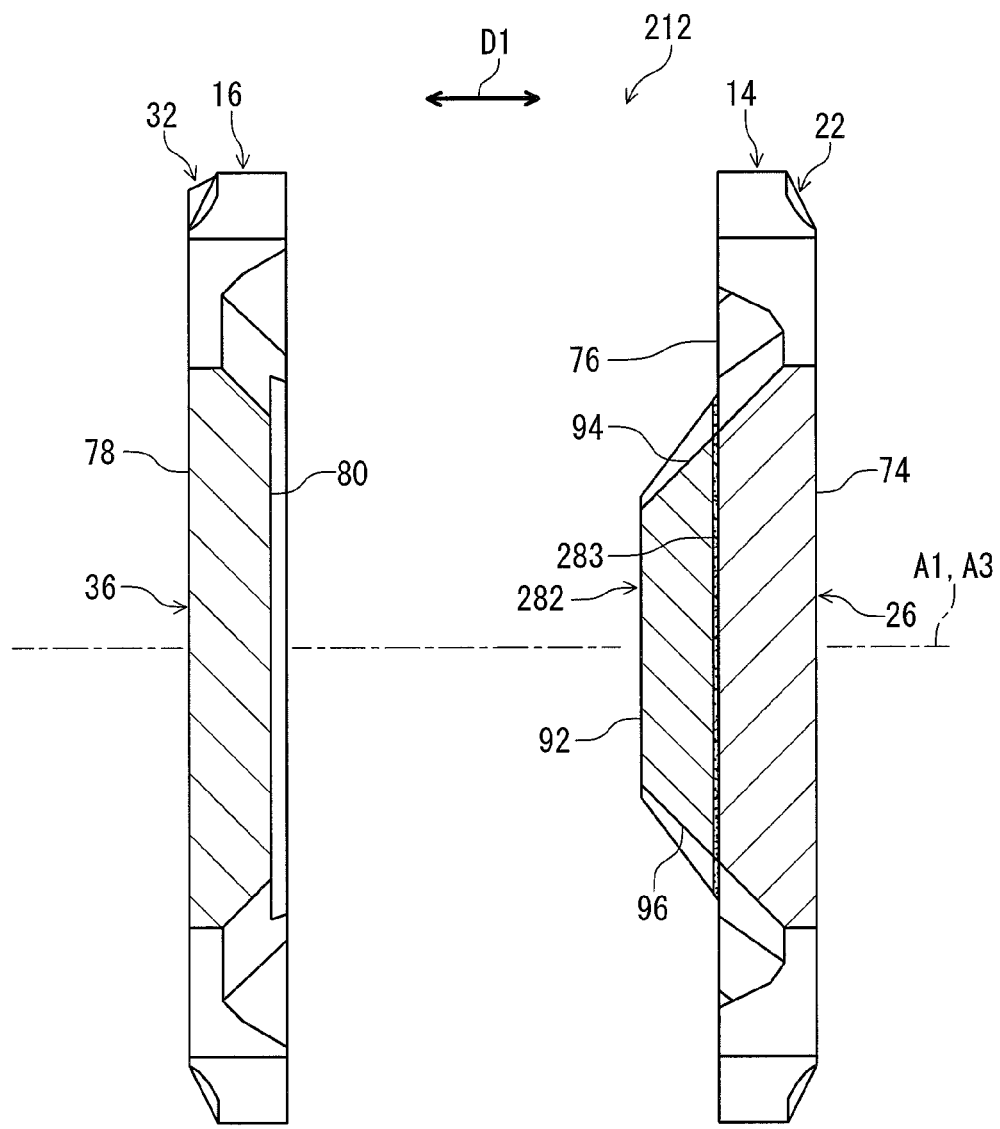
FIG. 18 is a cross-sectional view of the bicycle chain taken along line XVIII-XVIII of FIG. 17.

As seen in FIGS. 17 and 18, the bicycle chain 212 comprises an axial protuberance 282. The axial protuberance 282 has substantially the same structure as that of the axial protuberance 82 of the first embodiment. In this embodiment, however, the axial protuberance 282 is a separate member from the first outer link plate 14. The axial protuberance 282 includes a metallic material. The first outer link plate 14 includes a metallic material. Examples of the metallic material include iron, stainless steel, aluminum and titanium. The material of the axial protuberance 282 can be different from the material of the first outer link plate 14 and can be equal to the material of the first outer link plate 14.

As seen in FIG. 17, the axial protuberance 282 is attached to the first intermediate portion 26 via one of adhesive, diffusion bonding, and caulking. In this embodiment, the axial protuberance 282 is attached to the first intermediate portion 26 via adhesive 283. In a case where the axial protuberance 282 is attached to the first intermediate portion 26 via diffusion bonding, the axial protuberance 282 is in contact with the first outer link plate 14 without the adhesive 283.

Figure 19:
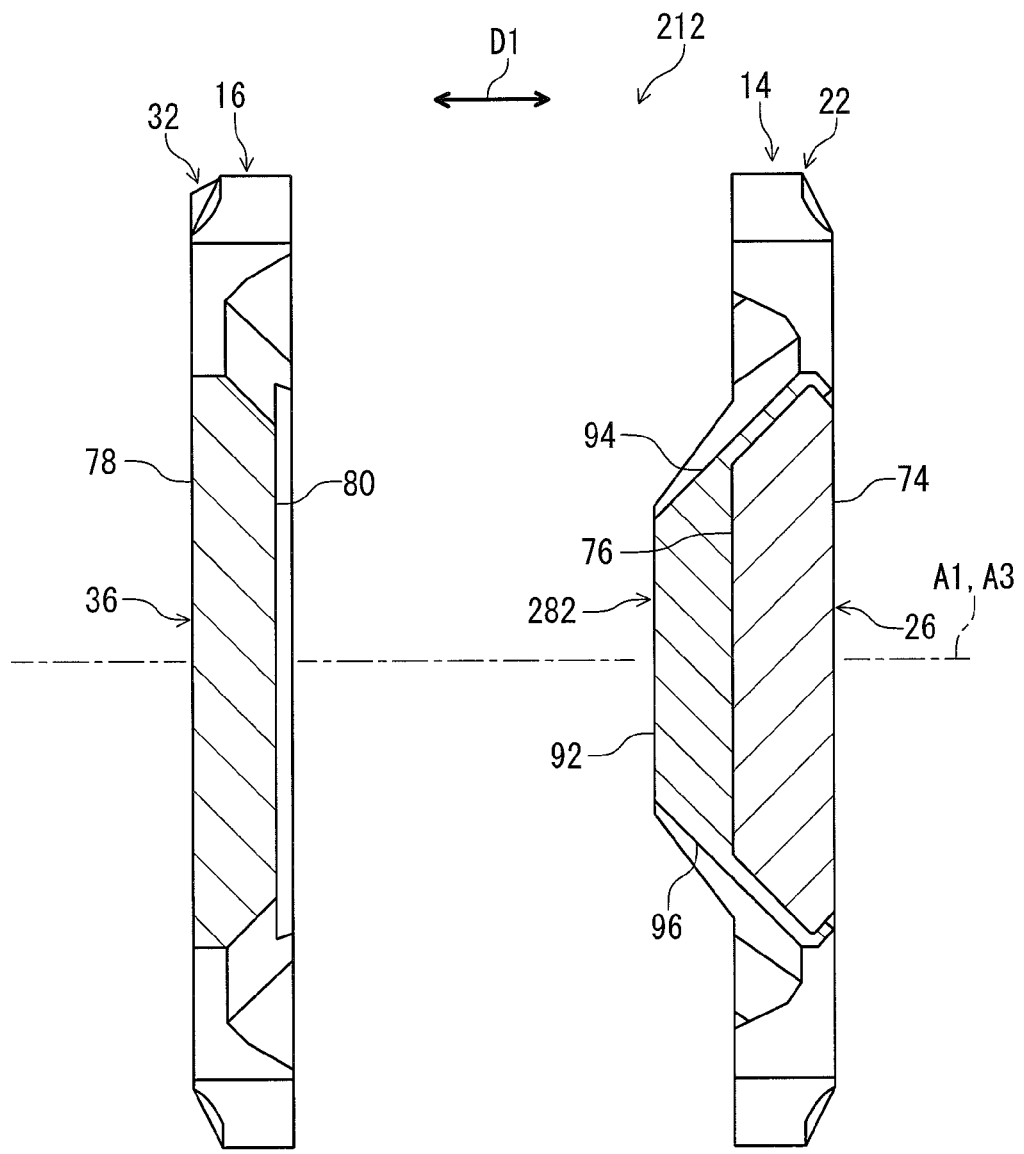
FIG. 19 is a cross-sectional view of a bicycle chain in accordance with a modification of the second embodiment.

In a case where the axial protuberance 282 is attached to the first intermediate portion 26 via caulking, as seen in FIG. 19, the axial protuberance 282 is fixedly engaged with the first outer link plate 14 by being at least partly deformed when the axial protuberance 282 is attached to the first outer link plate 14.

With the bicycle chain 212, it is possible to obtain the following effects in addition to and/or instead of the effect obtained by the bicycle chain 12 in accordance with the first embodiment.

Furthermore, since the axial protuberance 282 is a separate member from the first outer link plate 14, it is possible to select the material of the axial protuberance 282 regardless of the material of the first outer link plate 14.

Third Embodiment

A bicycle chain 312 in accordance with a third embodiment will be described below referring to FIGS. 20 and 21. The bicycle chain 312 has the same configuration as the bicycle chain 12 except for the axial protuberance. Thus, elements having substantially the same function as those in the above embodiments will be numbered the same here, and will not be described and/or illustrated again in detail here for the sake of brevity.

Figure 20:
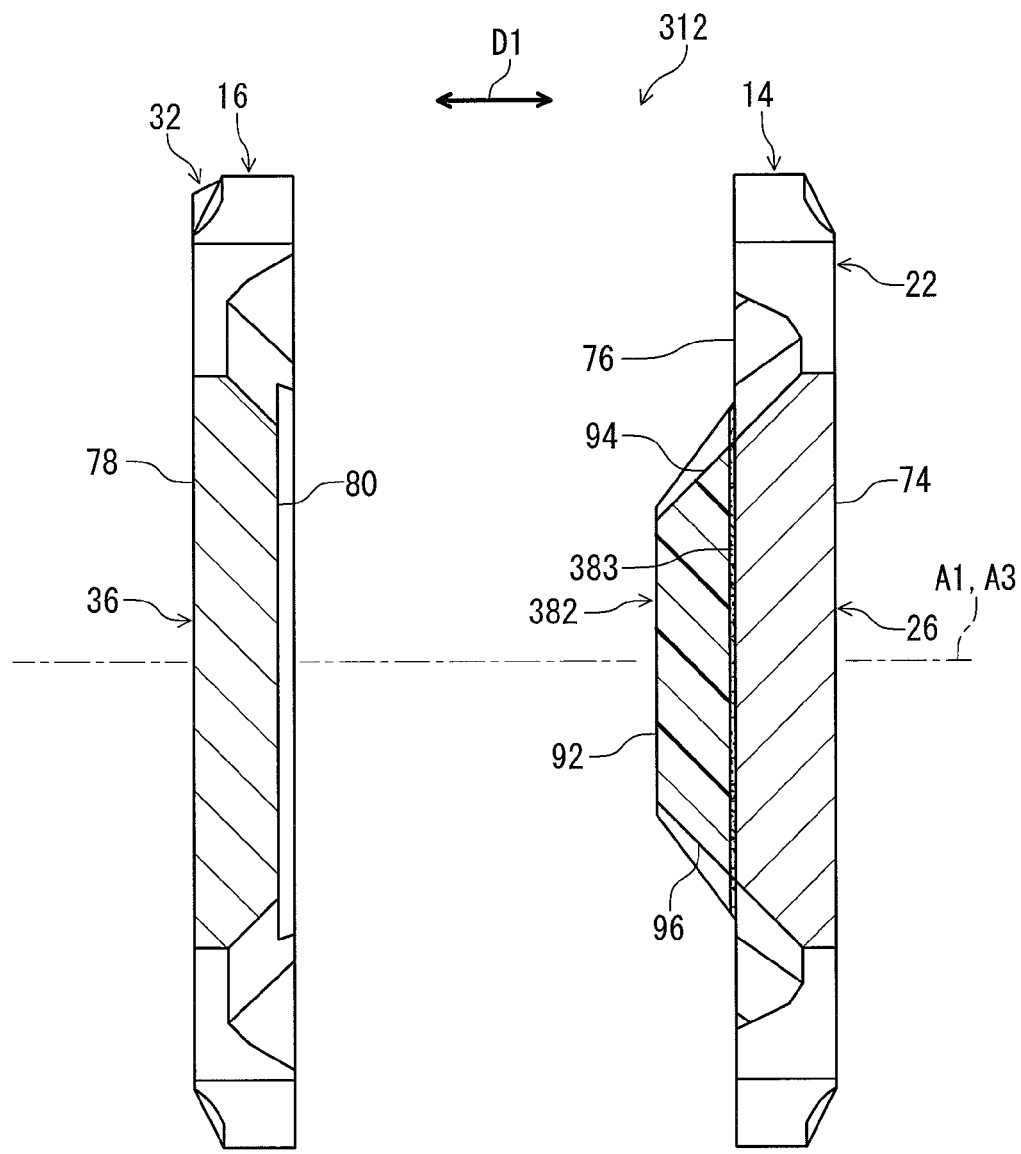
FIG. 20 is a cross-sectional view of a bicycle chain in accordance with a third embodiment.
Figure 21:
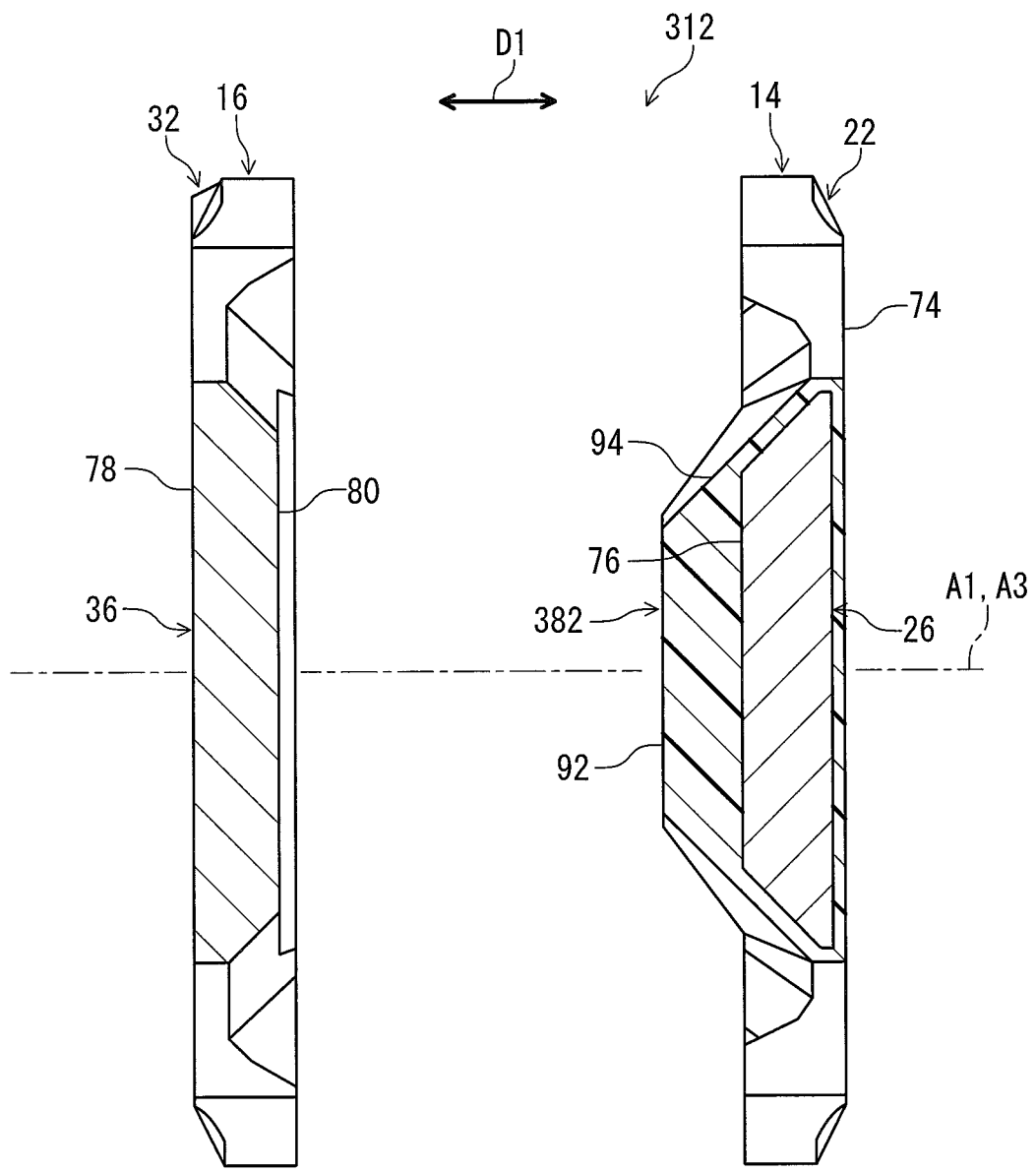
FIG. 21 is a cross-sectional view of a bicycle chain in accordance with a modification of the third embodiment.

As seen in FIG. 20, the bicycle chain 312 comprises an axial protuberance 382. The axial protuberance 382 has substantially the same structure as that of the axial protuberance 82 of the first embodiment. In this embodiment, however, the axial protuberance 382 includes a resin material.

The axial protuberance 382 is attached to the first intermediate portion 26 via one of adhesive and integral molding. In this embodiment, the axial protuberance 382 is attached to the first intermediate portion 26 via adhesive 383. In a case where the axial protuberance 382 is attached to the first intermediate portion 26 via integral molding, as seen in FIG. 21, the axial protuberance 382 is attached to the first intermediate portion 26 via insert molding. In such an embodiment, for example, the axial protuberance 382 covers the first intermediate portion 26. In a case where the first outer link plate 14 includes the resin material, the first outer link plate 14 and the axial protuberance 382 can be formed integrally with each other via integral molding as a single unitary member.

With the bicycle chain 312, it is possible to obtain the following effects in addition to and/or instead of the effect obtained by the bicycle chain 212 in accordance with the second embodiment.

The axial protuberance 382 is attached to the first intermediate portion 26 via one of the adhesive 383 and the integral molding. Accordingly, it is possible to effectively attach the axial protuberance 382 including the metallic material to the first outer link plate 14 in consideration of mass production. The production efficiency of the bicycle chain 312 is particularly improved if the axial protuberance 382 is attached to the first intermediate portion 26 via the integral molding.

Furthermore, since the axial protuberance 382 includes the resin material, the resin material can reduce unusual noises caused by interference between the axial protuberance 382 and the sprocket tooth B9 of the bicycle sprocket B5 and/or B6.

Fourth Embodiment

A bicycle chain 412 in accordance with a fourth embodiment will be described below referring to FIGS. 22 to 24. The bicycle chain 412 has the same configuration as the bicycle chain 212 except for the second outer link plate. Thus, elements having substantially the same function as those in the above embodiments will be numbered the same here, and will not be described and/or illustrated again in detail here for the sake of brevity.

Figure 22:
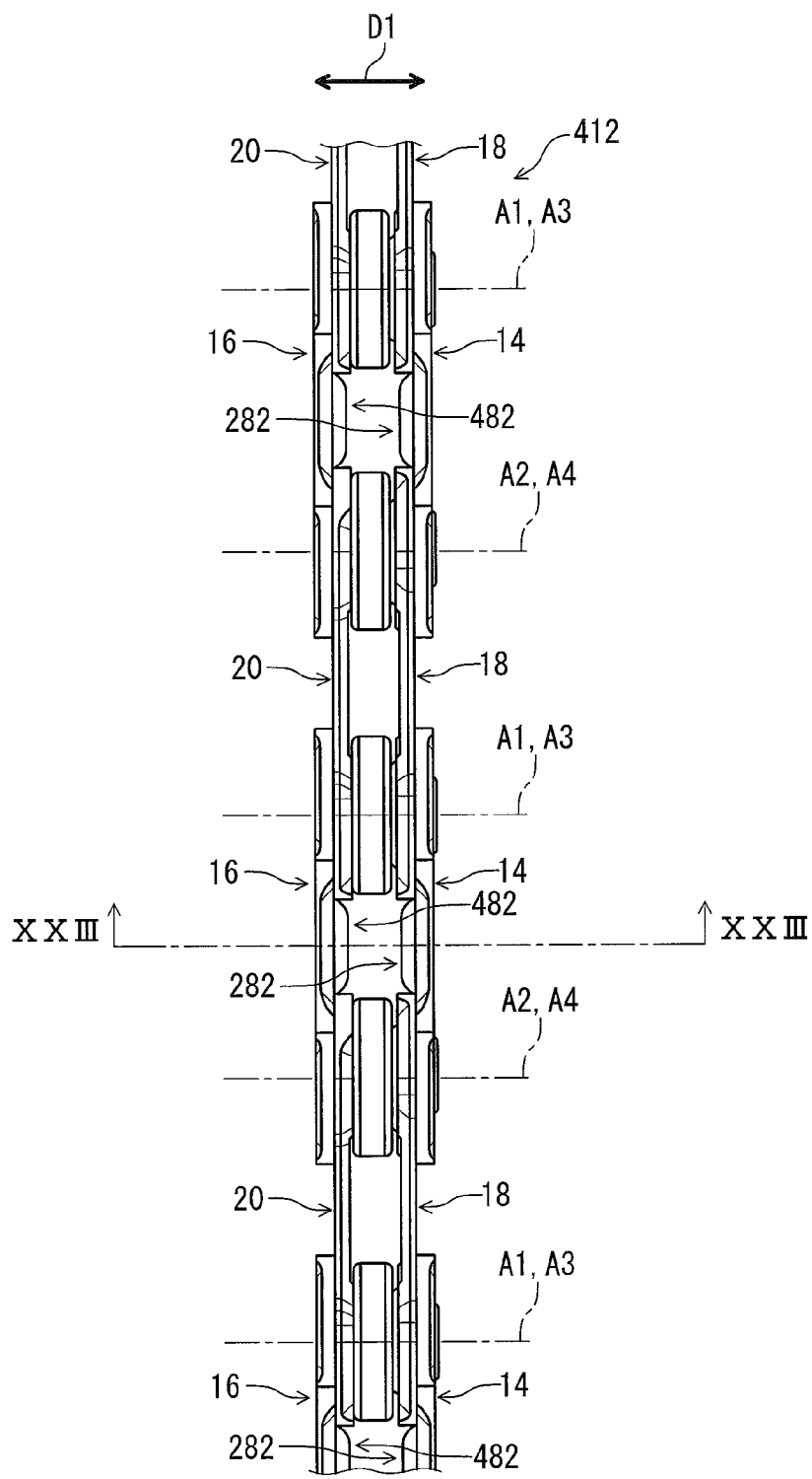
FIG. 22 is a plan view of a bicycle chain in accordance with a fourth embodiment.

As seen in FIG. 22, the bicycle chain 412 comprises at least one axial protuberance 282 and/or 482. In this embodiment, the bicycle chain 412 comprises the axial protuberances 282 and axial protuberances 482.

Figure 23:
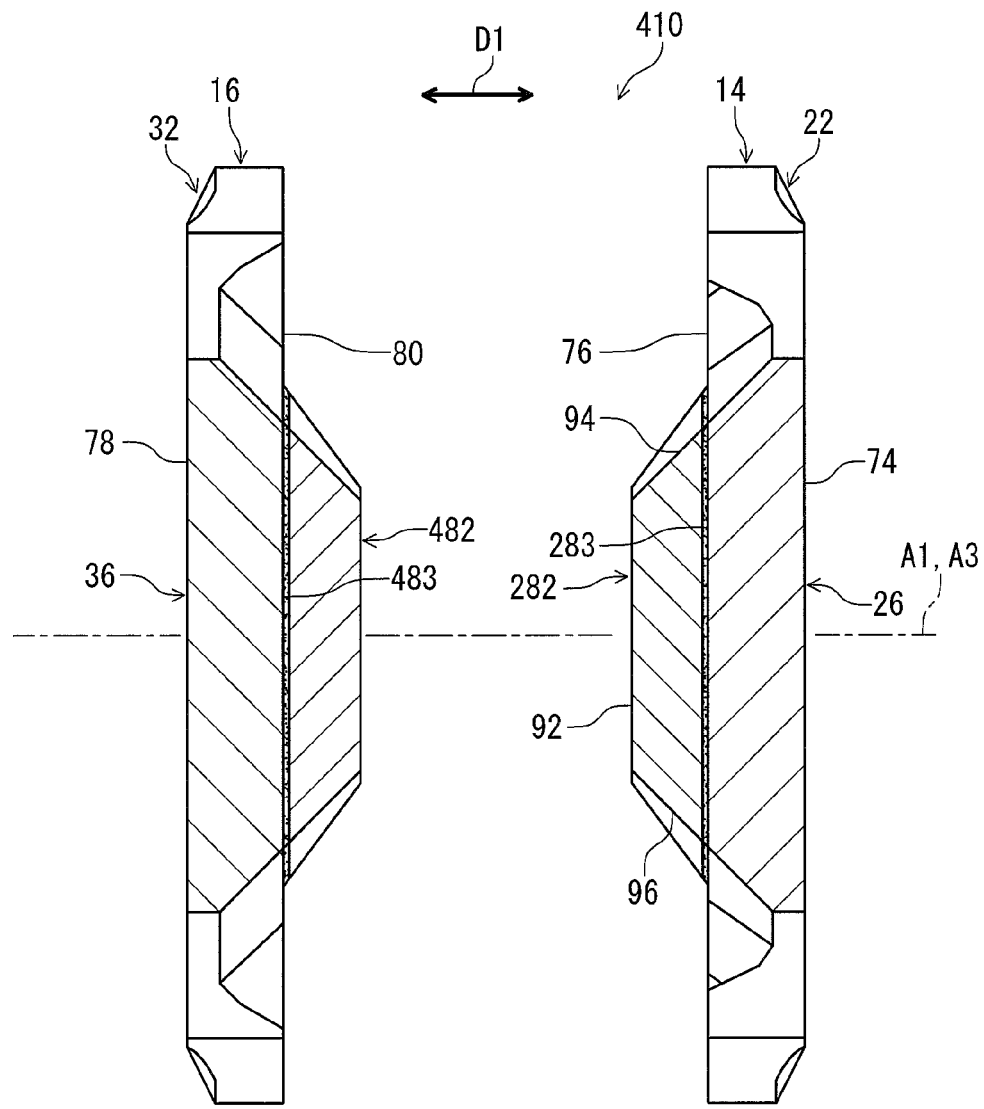
FIG. 23 is a cross-sectional view of the bicycle chain taken along line XXIII-XXIII of FIG. 22.

As seen in FIG. 23, the at least one axial protuberance 282 and/or 482 is a separate member from the first outer link plate 14 and the second outer link plate 16. The at least one axial protuberance 282 and/or 482 is attached to at least one of the first outer link plate 14 and the second outer link plate 16. In this embodiment, the axial protuberance 282 is attached to the first outer link plate 14. The axial protuberance 482 is attached to the second outer link plate 16. The axial protuberance 482 has substantially the same structure as that of the axial protuberance 282. However, the axial protuberance 482 can have the structure different from that of the axial protuberance 282.

The at least one axial protuberance 282 and/or 482 includes the metallic material. The at least one axial protuberance 282 and/or 482 is attached to at least one of the first intermediate portion 26 and the second intermediate portion 36 via one of adhesive, diffusion bonding, and caulking. In this embodiment, the axial protuberance 482 is attached to the second intermediate portion 36 via adhesive 483. In a case where the axial protuberance 482 is attached to the first intermediate portion 26 via diffusion bonding, the axial protuberance 482 is in contact with the second outer link plate 16 without the adhesive 483.

Figure 24:
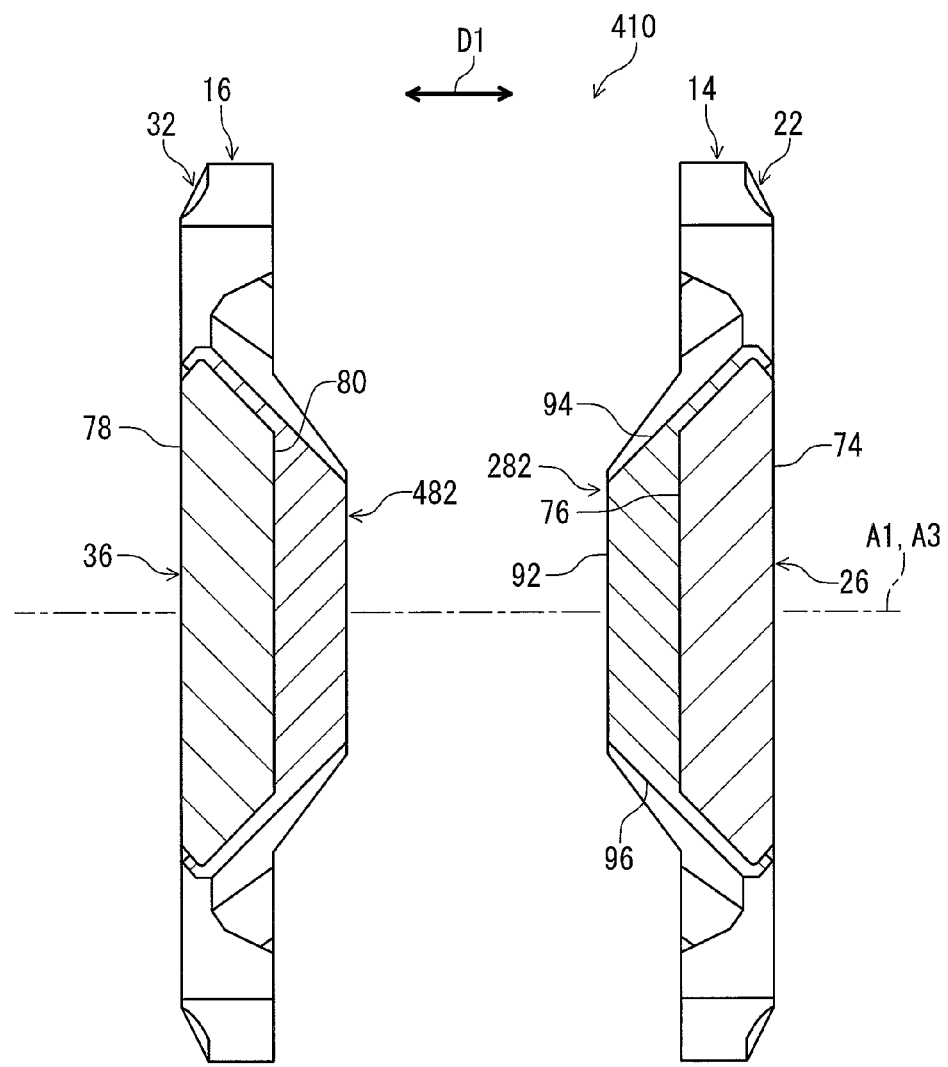
FIG. 24 is a cross-sectional view of the bicycle chain in accordance with a modification of the fourth embodiment.

In a case where the axial protuberance 482 is attached to the second intermediate portion 36 via caulking, as seen in FIG. 24, the axial protuberance 482 is fixedly engaged with the second outer link plate 16 by being at least partly deformed when the axial protuberance 482 is attached to the second outer link plate 16.

The at least one axial protuberance 282 and/or 482 includes the axial protuberance 282 protruding from the first inner surface 76 in the axial direction D1. As well as the bicycle chains 212 and 312 in the second and third embodiments, however, the second outer link plate 16 can be free from the at least one axial protuberance 282 and/or 482.

With the bicycle chain 412, it is possible to obtain the following effects in addition to and/or instead of the effect obtained by the bicycle chain 12 in accordance with the first embodiment.

Since the axial protuberance 282 is a separate member from the first outer link plate 14, it is possible to select the material of the axial protuberance 282 regardless of the material of the first outer link plate 14.

Since the axial protuberance 482 is a separate member from the second outer link plate 16, it is possible to select the material of the axial protuberance 482 regardless of the material of the second outer link plate 16.

The at least one axial protuberance 282 and/or 482 is attached to at least one of the first intermediate portion 26 and the second intermediate portion 36 via one of the adhesive 483, the diffusion bonding, and the caulking. Accordingly, it is possible to effectively attach the axial protuberance 282 and/or 482 including the metallic material to the first outer link plate 14 in consideration of mass production.

Furthermore, if the second outer link plate 16 is free from the at least one axial protuberance 282 and/or 482, it is possible to maintain the shifting performance of the bicycle chain 512 between the plurality of bicycle sprockets B5 and B6 by the front derailleur B7 and/or the rear derailleur B8.

Fifth Embodiment

A bicycle chain 512 in accordance with a fifth embodiment will be described below referring to FIGS. 25 to 27. The bicycle chain 512 has the same configuration as the bicycle chain 312 except for the second outer link plate. Thus, elements having substantially the same function as those in the above embodiments will be numbered the same here, and will not be described and/or illustrated again in detail here for the sake of brevity.

Figure 25:
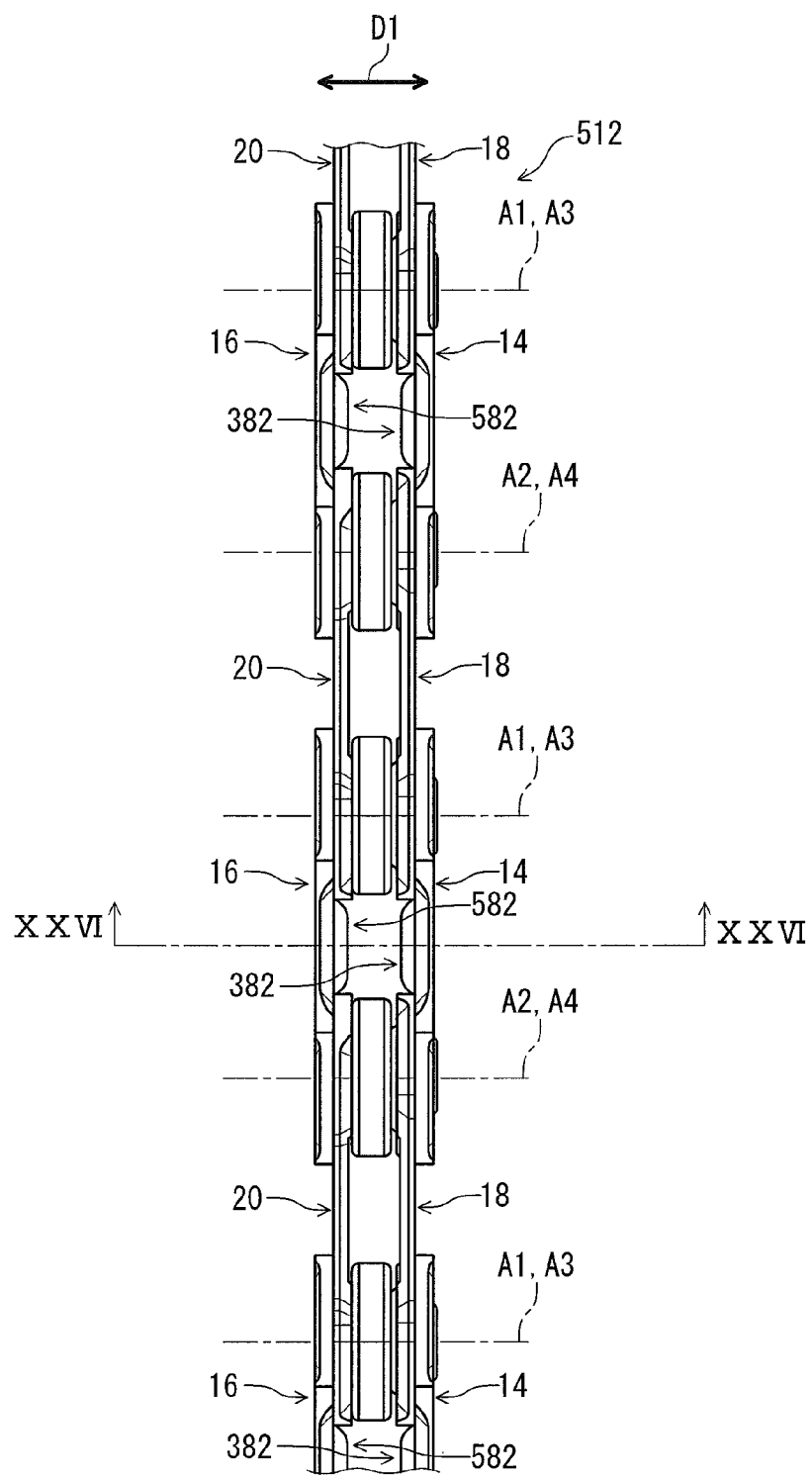
FIG. 25 is a plan view of a bicycle chain in accordance with a fifth embodiment.

As seen in FIG. 25, the bicycle chain 512 comprises at least one axial protuberance 382 and/or 582. In this embodiment, the bicycle chain 512 comprises axial protuberances 382 and axial protuberances 582.

Figure 26:
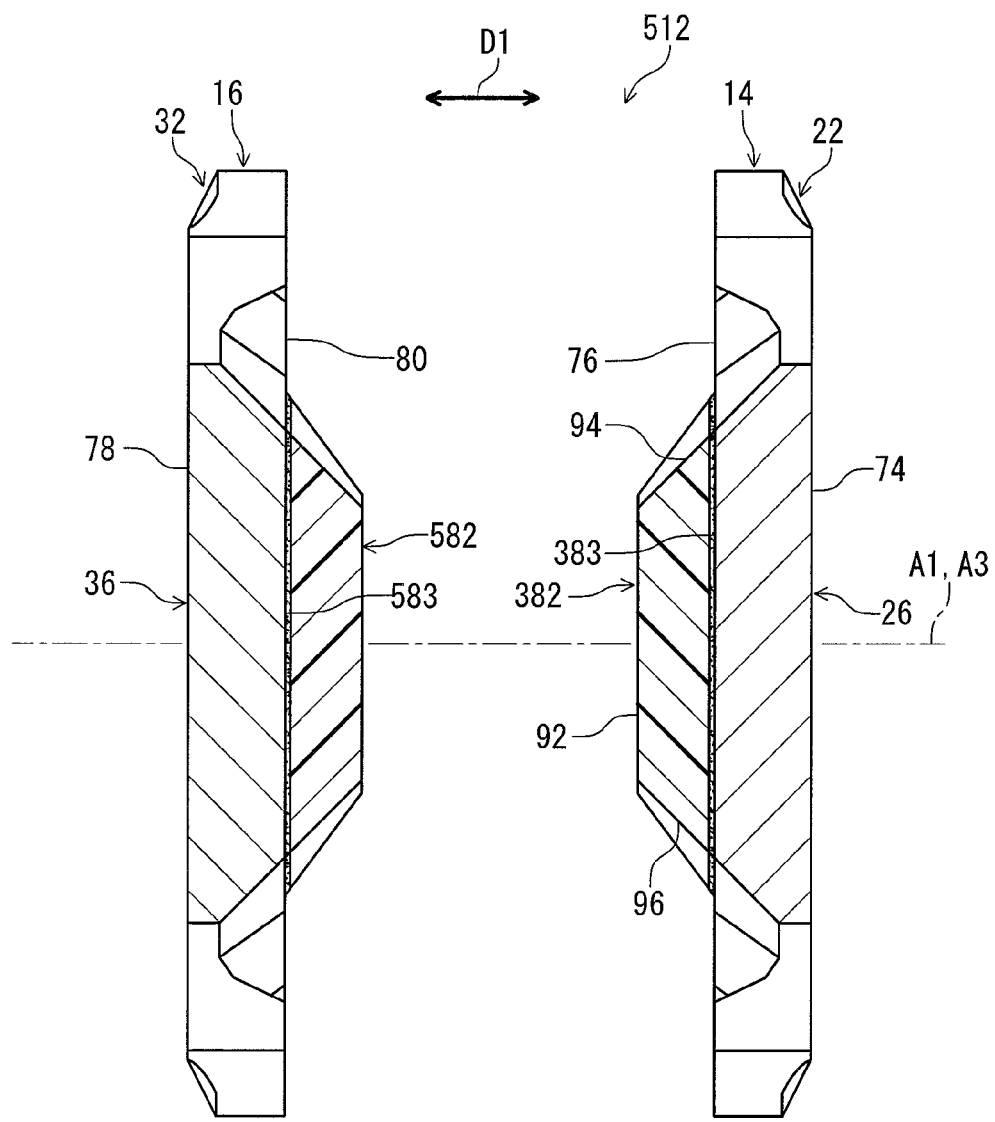
FIG. 26 is a cross-sectional view of the bicycle chain taken along line XXVI-XXVI of FIG. 25.
Figure 27:
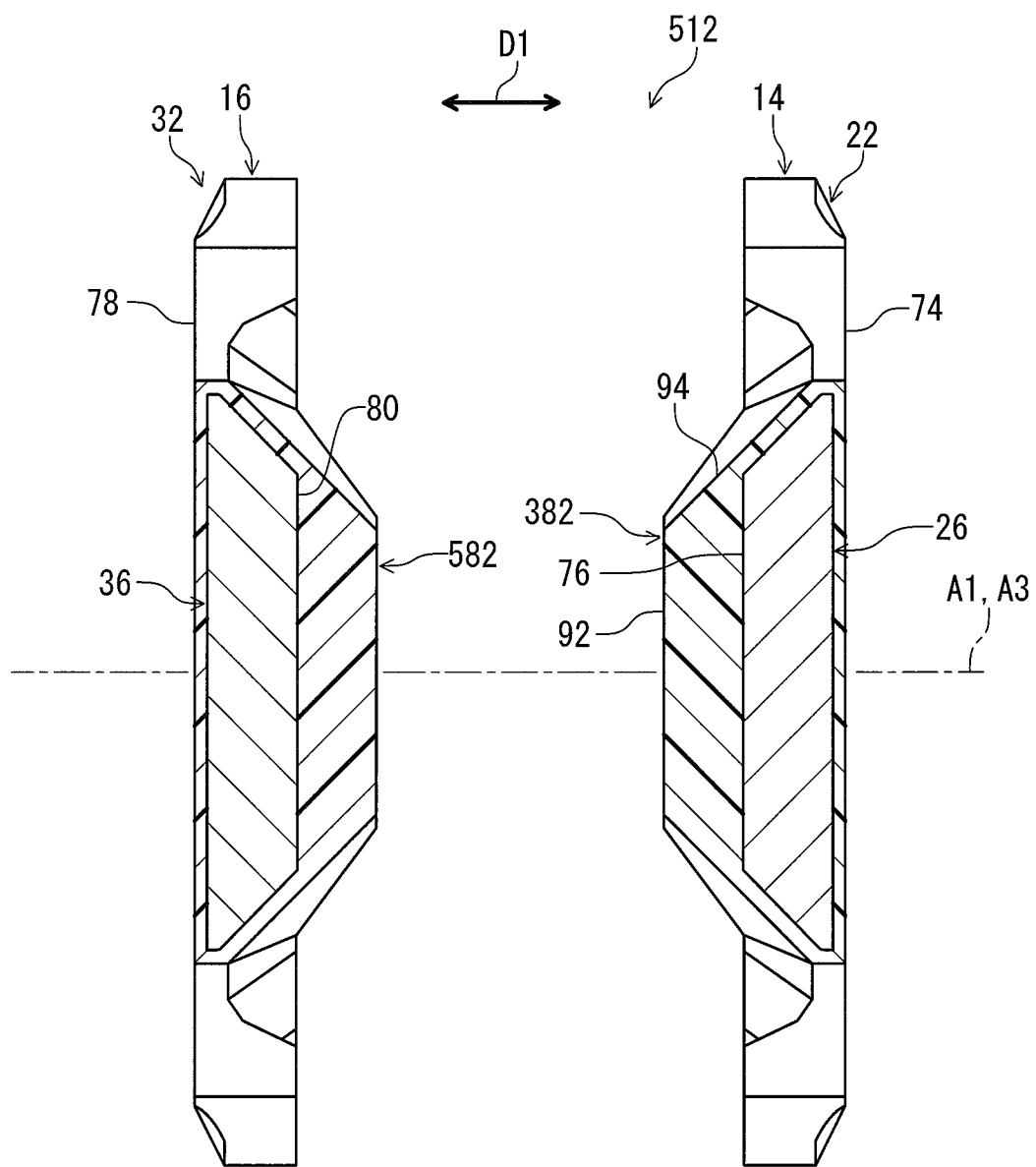
FIG. 27 is a cross-sectional view of the bicycle chain in accordance with a modification of the fifth embodiment.

As seen in FIG. 26, the at least one axial protuberance 382 and/or 582 is a separate member from the first outer link plate 14 and the second outer link plate 16. The at least one axial protuberance 382 and/or 582 is attached to at least one of the first outer link plate 14 and the second outer link plate 16. In this embodiment, the axial protuberance 382 is attached to the first outer link plate 14. The axial protuberance 582 is attached to the second outer link plate 16. The axial protuberance 582 has substantially the same structure as that of the axial protuberance 382. However, the axial protuberance 582 can have the structure different from that of the axial protuberance 382.

The at least one axial protuberance 382 and/or 582 includes a resin material. The at least one axial protuberance 382 and/or 582 is attached to at least one of the first intermediate portion 26 and the second intermediate portion 36 via one of adhesive and integral molding. In this embodiment, the axial protuberance 582 is attached to the second intermediate portion 36 via adhesive 583. In a case where the axial protuberance 582 is attached to the second intermediate portion 36 via integral molding, as seen in FIG. 27, the axial protuberance 582 is attached to the second intermediate portion 36 via insert molding. In such an embodiment, the axial protuberance 582 covers the second intermediate portion 36. In a case where the second outer link plate 16 includes a resin material, the second outer link plate 16 and the axial protuberance 582 can be formed integrally with each other via integral molding as a single unitary member.

The at least one axial protuberance 382 and/or 582 includes the axial protuberance 382 protruding from the first inner surface 76 in the axial direction D1. As well as the bicycle chains 212 and 312, however, the second outer link plate 16 can be free from the at least one axial protuberance 382 and/or 582.

With the bicycle chain 512, it is possible to obtain the following effects in addition to and/or instead of the effect obtained by the bicycle chain 412 in accordance with the second embodiment.

Since the axial protuberance 382 includes the resin material, the resin material can reduce unusual noises caused by interference between the axial protuberance 382 and the sprocket tooth B9 of the bicycle sprocket B5 and/or B6.

Since the axial protuberance 582 includes the resin material, the resin material can reduce unusual noises caused by interference between the axial protuberance 582 and the sprocket tooth B9 of the bicycle sprocket B5 and/or B6.

The at least one axial protuberance 582 is attached to at least one of the first intermediate portion 26 and the second intermediate portion 36 via one of the adhesive 583 and the integral molding. Accordingly, it is possible to effectively attach the axial protuberance 582 including the metallic material to the first outer link plate 14 in consideration of mass production. The production efficiency of the bicycle chain 512 is particularly improved if the axial protuberance 582 is attached to the first intermediate portion 26 via the integral molding.

Furthermore, if the second outer link plate 16 is free from the at least one axial protuberance 382 and/or 582, it is possible to maintain the shifting performance of the bicycle chain 512 between the plurality of bicycle sprockets B5 and B6 by the front derailleur B7 and/or the rear derailleur B8.

It will be apparent to those skilled in the bicycle field from the present disclosure that the structures of the above embodiments can be at least partly combined with each other.

In the present application, the term "attached" or "attaching", as used herein, can encompass configurations in which an element is directly attached to the other element by affixing the element directly to the other element; configurations in which the element is indirectly attached to the other element via the intermediate member(s); and configurations in which one element is integral with the other element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle chain comprising:
   a first outer link plate comprising:
      a first end portion including a first opening having a first center axis;
      a second end portion including a second opening having a second center axis; and
      a first intermediate portion interconnecting the first end portion and the second end portion;
   a second outer link plate spaced apart from the first outer link plate in an axial direction parallel to the first center axis and the second center axis in an assembled state where the bicycle chain is assembled, the second outer link plate comprising:
      a third end portion including a third opening having a third center axis;
      a fourth end portion including a fourth opening having a fourth center axis; and
      a second intermediate portion interconnecting the third end portion and the fourth end portion;
   the first outer link plate including a first outer surface and a first inner surface opposite to the first outer surface in the axial direction, the second outer link plate including a second outer surface and a second inner surface opposite to the second outer surface in the axial direction, the first inner surface and the second inner surface being configured to face each other in the assembled state;
   an axial protuberance protruding from the first inner surface of the first intermediate portion in the axial direction; and
   the second intermediate portion of the second outer link plate being free from an axial protuberance protruding from the second inner surface of the second intermediate portion in the axial direction.

2. The bicycle chain according to claim 1, wherein the axial protuberance is provided integrally with the first outer link plate as a single unitary member.

3. The bicycle chain according to claim 1, wherein the axial protuberance is a separate member from the first outer link plate.

4. The bicycle chain according to claim 3, wherein the axial protuberance includes a metallic material.

5. The bicycle chain according to claim 4, wherein the axial protuberance is attached to the first intermediate portion via one of adhesive, diffusion bonding, and caulking.

6. The bicycle chain according to claim 3, wherein the axial protuberance includes a resin material.

7. The bicycle chain according to claim 6, wherein the axial protuberance is attached to the first intermediate portion via one of adhesive and integral molding.

8. The bicycle chain according to claim 1, further comprising:
   a first inner link plate comprising:
      a fifth end portion including a fifth opening having a fifth center axis, the fifth end portion being pivotally coupled to the second end portion of the first outer link plate;
      a sixth end portion including a sixth opening having a sixth center axis; and
      a third intermediate portion interconnecting the fifth end portion and the sixth end portion; and
   a second inner link plate spaced apart from the first inner link plate in the axial direction in the assembled state, the second inner link plate comprising:
      a seventh end portion including a seventh opening having a seventh center axis, the seventh end portion being pivotally coupled to the fourth end portion of the second outer link plate;
      an eighth end portion including an eighth opening having an eighth center axis; and
      a fourth intermediate portion interconnecting the seventh end portion and the eighth end portion, wherein the first inner link plate includes a third outer surface and a third inner surface opposite to the third outer surface in the axial direction, the second inner link plate includes a fourth outer surface and a fourth inner surface opposite to the fourth outer surface in the axial direction, the third inner surface and the fourth inner surface are configured to face each other in the assembled state, the axial protuberance includes an axial end surface facing the second inner surface of the second outer link plate in the axial direction in the assembled state, the axial end surface of the axial protuberance is closest to the second intermediate portion of the second outer link plate in the axial direction in the axial protuberance, and the axial end surface is provided at an axial position which is substantially equal to an axial position of the third inner surface of the first inner link plate in the axial direction.

9. The bicycle chain according to claim 1, wherein the first outer link plate is closer to a bicycle frame than the second outer link plate in the axial direction in an engagement state where the bicycle chain is engaged with a bicycle sprocket rotatable relative to the bicycle frame.

10. The bicycle chain according to claim 1, wherein the second outer link plate is closer to a bicycle frame than the first outer link plate in the axial direction in an engagement state where the bicycle chain is engaged with a bicycle sprocket rotatable relative to the bicycle frame.

11. The bicycle chain according to claim 1, wherein the axial protuberance includes an axial end surface and an inclined surface, the axial end surface faces the second inner surface of the second outer link plate in the axial direction in the assembled state, and the inclined surface is inclined relative to the axial end surface.

12. The bicycle chain according to claim 11, wherein the axial protuberance includes an additional inclined surface, the additional inclined surface is inclined relative to the axial end surface, and the axial end surface is provided between the inclined surface and the additional inclined surface.

13. The bicycle chain according to claim 12, wherein the inclined surface extends from the first intermediate portion to the axial end surface beyond the first inner surface of the first outer link plate, and the additional inclined surface extends from the first intermediate portion to the axial end surface beyond the first inner surface of the first outer link plate.

14. A bicycle chain comprising:
a first outer link plate comprising:
  a first end portion including a first opening having a first center axis;
  a second end portion including a second opening having a second center axis; and
  a first intermediate portion interconnecting the first end portion and the second end portion;
a second outer link plate spaced apart from the first outer link plate in an axial direction parallel to the first center axis and the second center axis in an assembled state where the bicycle chain is assembled, the second outer link plate comprising:
  a third end portion including a third opening having a third center axis;
  a fourth end portion including a fourth opening having a fourth center axis; and
  a second intermediate portion interconnecting the third end portion and the fourth end portion;
the first outer link plate including a first outer surface and a first inner surface opposite to the first outer surface in the axial direction, the second outer link plate including a second outer surface and a second inner surface opposite to the second outer surface in the axial direction, the first inner surface and the second inner surface being configured to face each other in the assembled state;

at least one axial protuberance protruding from at least one of the first inner surface and the second inner surface in the axial direction; and the at least one axial protuberance being a separate member from the first outer link plate and the second outer link plate and being attached to at least one of the first outer link plate and the second outer link plate.

15. The bicycle chain according to claim 14, wherein the at least one axial protuberance includes a metallic material.

16. The bicycle chain according to claim 15, wherein the at least one axial protuberance is attached to at least one of the first intermediate portion and the second intermediate portion via one of adhesive, diffusion bonding, and caulking.

17. The bicycle chain according to claim 14, wherein the at least one axial protuberance includes a resin material.

18. The bicycle chain according to claim 17, wherein the at least one axial protuberance is attached to at least one of the first intermediate portion and the second intermediate portion via one of adhesive and integral molding.

19. The bicycle chain according to claim 14, wherein the at least one axial protuberance includes an axial protuberance protruding from the first inner surface in the axial direction, and the second outer link plate is free from the at least one axial protuberance.

20. The bicycle chain according to claim 14, wherein the axial protuberance includes an axial end surface and an inclined surface, the axial end surface faces the second inner surface of the second outer link plate in the axial direction in the assembled state, and the inclined surface is inclined relative to the axial end surface.

21. The bicycle chain according to claim 20, wherein the axial protuberance includes an additional inclined surface, the additional inclined surface is inclined relative to the axial end surface, and the axial end surface is provided between the inclined surface and the additional inclined surface.

22. The bicycle chain according to claim 21, wherein the inclined surface extends from the first intermediate portion to the axial end surface beyond the first inner surface of the first outer link plate, and the additional inclined surface extends from the first intermediate portion to the axial end surface beyond the first inner surface of the first outer link plate.

23. The bicycle chain according to claim 1, wherein
the second outer link plate includes at least one chamfer disposed on at least one of the second outer surface and the second inner surface.

24. The bicycle chain according to claim 23, wherein
the at least one chamfer is disposed on the second inner surface to facilitate a shifting operation of the bicycle chain.

25. The bicycle chain according to claim 23, wherein
the at least one chamfer is disposed on the second outer surface to avoid excessive contact between the second outer link plate and a bicycle derailleur.

26. The bicycle chain according to claim 1, wherein
the first outer link plate includes at least one chamfer disposed on the first outer surface to reduce noise resulting from contact between the first outer link plate and a sprocket tooth of a bicycle sprocket.

27. A bicycle chain comprising:
a first outer link plate comprising:
  a first end portion including a first opening having a first center axis;
  a second end portion including a second opening having a second center axis; and
  a first intermediate portion interconnecting the first end portion and the second end portion;
a second outer link plate spaced apart from the first outer link plate in an axial direction parallel to the first center axis and the second center axis in an assembled state where the bicycle chain is assembled, the second outer link plate comprising:
  a third end portion including a third opening having a third center axis;
  a fourth end portion including a fourth opening having a fourth center axis; and
  a second intermediate portion interconnecting the third end portion and the fourth end portion;
the first outer link plate including a first outer surface and a first inner surface opposite to the first outer surface in the axial direction, the second outer link plate including a second outer surface and a second inner surface opposite to the second outer surface in the axial direction, the first inner surface and the second inner surface being configured to face each other in the assembled state;
an axial protuberance protruding from the first inner surface of the first intermediate portion in the axial direction; and
the second outer link plate including at least one chamfer disposed on at least one of the second outer surface and the second inner surface.

28. The bicycle chain according to claim 27, wherein
the at least one chamfer is disposed on the second inner surface to facilitate a shifting operation of the bicycle chain.

29. The bicycle chain according to claim 27, wherein
the at least one chamfer is disposed on the second outer surface to avoid excessive contact between the second outer link plate and a bicycle derailleur.

30. The bicycle chain according to claim 27, wherein
the first outer link plate includes at least one chamfer disposed on the first outer surface to reduce noise resulting from contact between the first outer link plate and a sprocket tooth of a bicycle sprocket.

* * * * *